(12) United States Patent
Bernard et al.

(10) Patent No.: US 12,189,071 B2
(45) Date of Patent: Jan. 7, 2025

(54) MOBILE DOCKING DEVICE FOR SEISMIC ACQUISITION NODES AND METHOD

(71) Applicant: SERCEL, Carquefou (FR)

(72) Inventors: Cyrille Bernard, Saint-Philibert de Grand-Lieu (FR); Mathieu Sanche, Nort sur Erdre (FR); Bertrand Tijou, Mauves sur loire (FR)

(73) Assignee: SERCEL, Carquefou (FR)

( * ) Notice: Subject to any disclaimer, the term of this patent is extended or adjusted under 35 U.S.C. 154(b) by 342 days.

(21) Appl. No.: 17/876,977

(22) Filed: Jul. 29, 2022

(65) Prior Publication Data

US 2023/0258837 A1 Aug. 17, 2023

(30) Foreign Application Priority Data

Feb. 11, 2022 (IN) .............................. 2022/34007440
Feb. 16, 2022 (RU) ................................. 2022104032
Mar. 9, 2022 (CN) .......................... 202220512915.0

(51) Int. Cl.
*G06F 1/16* (2006.01)
*G01V 1/24* (2006.01)
(Continued)

(52) U.S. Cl.
CPC ............ *G01V 1/247* (2013.01); *H02J 7/0013* (2013.01); *H02J 7/0044* (2013.01)

(58) Field of Classification Search
CPC ......... G01V 1/247; G01V 1/24; H02J 7/0013; H02J 7/0044; H02J 7/0042; H05K 5/0256; H05K 5/026; H05K 7/023; H05K 7/1474

See application file for complete search history.

(56) References Cited

U.S. PATENT DOCUMENTS

| 5,253,223 A | 10/1993 | Svenning et al. |
| 7,195,505 B1 | 3/2007 | Becker |

(Continued)

FOREIGN PATENT DOCUMENTS

| CA | 3075873 A1 | 3/2019 |
| CN | 101944694 A | 1/2011 |

(Continued)

OTHER PUBLICATIONS

Advisory Action in related/corresponding U.S. Appl. No. 16/569,855 dated Dec. 1, 2020.

(Continued)

*Primary Examiner* — Anthony M Haughton
(74) *Attorney, Agent, or Firm* — PATENT PORTFOLIO BUILDERS PLLC

(57) ABSTRACT

A mobile docking device is configured to receive seismic acquisition units. The mobile docking device includes a container having a front opening, a docking module located within the container, the docking module having plural docking bays, each docking bay being configured to receive one of the seismic acquisition units through the front opening, a removable front wall configured to be attached to the container to cover the front opening to secure the seismic acquisition units, and handles attached to the container. The removable front wall biases the seismic acquisition units to maintain a direct electrical connection between tubular pins of the plural docking bays and pins of the seismic acquisition units during transport of the mobile docking device.

20 Claims, 21 Drawing Sheets

(51) Int. Cl.
*H02J 7/00* (2006.01)
*H05K 5/00* (2006.01)
*H05K 7/00* (2006.01)

(56) References Cited

U.S. PATENT DOCUMENTS

| | | | |
|---|---|---|---|
| 7,668,044 | B2 | 2/2010 | Brinkman et al. |
| 7,725,264 | B2 | 5/2010 | Pavel et al. |
| 8,547,796 | B2 | 10/2013 | Wilcox et al. |
| 2005/0134003 | A1 | 6/2005 | Bryde et al. |
| 2005/0246137 | A1 | 11/2005 | Brinkman et al. |
| 2005/0276162 | A1 | 12/2005 | Brinkmann et al. |
| 2008/0246137 | A1* | 10/2008 | Mahler ............... H01L 24/29 257/E23.141 |
| 2009/0086797 | A1 | 4/2009 | Wilcox |
| 2009/0093687 | A1 | 4/2009 | Telfort et al. |
| 2012/0008460 | A1* | 1/2012 | Crice ................... G01V 1/24 367/37 |
| 2013/0300266 | A1* | 11/2013 | Ramey ............ H05K 7/20745 312/236 |
| 2013/0336092 | A1 | 12/2013 | Pennec et al. |
| 2014/0126327 | A1 | 5/2014 | Swier et al. |
| 2014/0126329 | A1* | 5/2014 | Guyton ................ G01V 1/18 367/76 |
| 2014/0177387 | A1* | 6/2014 | Brizard .............. G01V 1/3843 367/15 |
| 2014/0219051 | A1 | 8/2014 | Pavel |
| 2014/0379129 | A1* | 12/2014 | Edsinger ............. B25J 9/0009 700/254 |
| 2015/0171793 | A1 | 6/2015 | Regier |
| 2015/0355610 | A1 | 12/2015 | Petrocy et al. |
| 2016/0011324 | A1 | 1/2016 | Hamon et al. |
| 2016/0224057 | A1 | 8/2016 | Ecker et al. |
| 2017/0293042 | A1* | 10/2017 | Dudley ............... G05D 1/0206 |
| 2017/0299740 | A1 | 10/2017 | Guyton et al. |
| 2018/0341033 | A1 | 11/2018 | Olivier et al. |
| 2020/0241156 | A1 | 7/2020 | Contant et al. |
| 2020/0318462 | A1 | 10/2020 | Ross et al. |
| 2021/0063483 | A1 | 3/2021 | Hermann |
| 2021/0080599 | A1 | 3/2021 | Gregoire et al. |
| 2021/0080603 | A1 | 3/2021 | Dabouineau et al. |
| 2021/0088687 | A1* | 3/2021 | Mancini ................ B63G 8/08 |

FOREIGN PATENT DOCUMENTS

| | | |
|---|---|---|
| CN | 217404544 U | 9/2022 |
| EP | 1995609 A1 | 11/2008 |
| EP | 2677346 A1 | 12/2013 |
| FR | 2981212 B1 | 11/2013 |
| IN | 202234007440 A | 1/2023 |
| RU | 214505 U1 | 11/2022 |
| WO | 2013015795 A1 | 1/2013 |
| WO | 2021048630 A1 | 3/2021 |

OTHER PUBLICATIONS

International Search Report/Written Opinion dated Jan. 13, 2021 in related/corresponding PCT Application No. PCT/IB2020/000763.
International Search Report/Written Opinion dated Jan. 18, 2021 in related/corresponding PCT Application No. PCT/IB2020/000755.
International Search Report/Written Opinion dated Mar. 22, 2021 in related/corresponding PCT Application No. PCT/IB2020/000762.
Invitation to Pay Additional Fees with Partial Search Report dated Jan. 12, 2021 in related/corresponding PCT Application No. PCT/IB2020/000762.
Office Action in related/corresponding U.S. Appl. No. 16/569,846 dated Jul. 8, 2022.
Office Action in related/corresponding U.S. Appl. No. 16/569,855 dated Feb. 6, 2020.

* cited by examiner

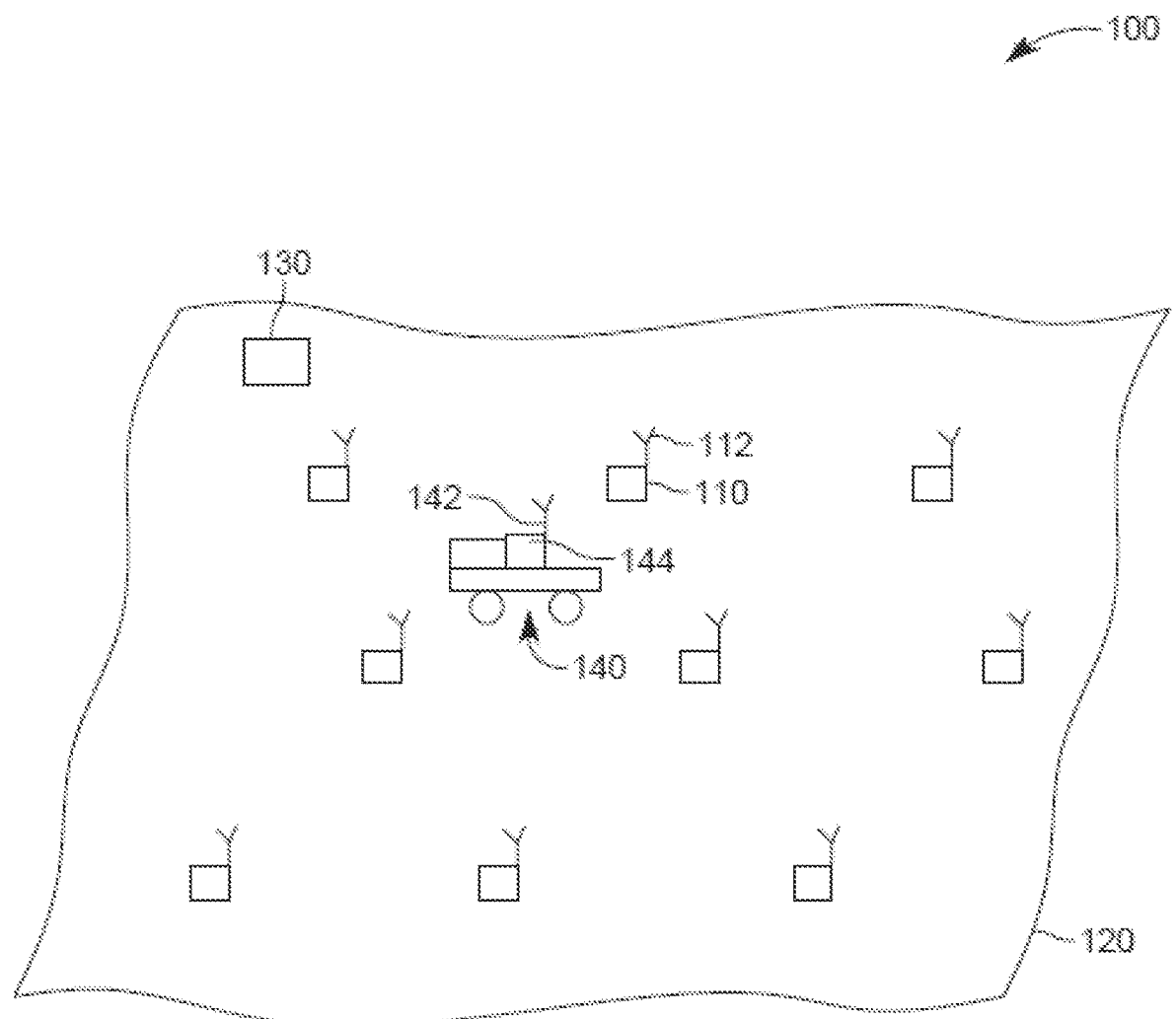
FIG.1 — STATE OF THE ART

MOBILE DOCKING DEVICE FOR SEISMIC ACQUISITION NODES AND METHOD

BACKGROUND

Technical Field

Embodiments of the subject matter disclosed herein generally relate to a mobile docking device that is configured to receive plural seismic acquisition units for executing one or more operations with said seismic acquisition units such as power recharge, data download, and/or testing. The mobile docking device can be brought to the field and be displaced during operation by one or two persons.

Discussion of the Background

Reflection seismology is a method of geophysical exploration to determine the properties of earth's subsurface, which is especially helpful in the oil and gas industry. Land reflection seismology is based on using a controlled source of energy that sends the energy into the earth. By measuring the time it takes for the reflections to come back to plural receivers, distributed over an area of interest, it is possible to evaluate the depth of features causing such reflections. While this profile does not provide an accurate location of oil and gas reservoirs, it suggests, to those trained in the field, the presence or absence of these reservoirs. Thus, providing a high-resolution image of geophysical structures under the surface is an ongoing process.

One system for recording the reflections of the seismic waves off the geological structures present in the subsurface makes use of plural seismic acquisition units, also referred to as seismic nodes. The seismic nodes are capable of providing good data because they facilitate data acquisition with wide-azimuth geometry. Wide-azimuth coverage is helpful for imaging beneath complex overburdens such as those associated with salt bodies. The seismic nodes can also provide multi-component data.

For a given seismic survey 100, as shown in FIG. 1, hundreds if not thousands of wireless seismic nodes 110 are distributed over an area 120 of interest for recording seismic signals. The wireless seismic nodes 110 can be placed according to a given orderly pattern over the area 120, or in any other way. The wireless seismic nodes 110 are configured to exchange data in an ad-hoc network. In one implementation, the wireless seismic nodes 110 communicate with a general controller 130 and can receive instructions or commands from this controller. In another implementation, a harvester 140 having its own antenna 142 and processing capabilities 144 can move about each node and collect the stored seismic data. Each seismic node 110 includes dedicated electronics that is housed inside the node, and at least one antenna 112 that may extend outside the housing. The recording of the seismic signals can be implemented in various ways, for example, in short periods of time repeated over a long period of time, or continuously over a long period of time. Regardless of the method selected for recording the seismic data, the wireless seismic nodes have a limited amount of electrical power for functioning and also a limited amount of memory for recording the seismic data. The electrical power constraints are further exacerbated by the need of the nodes to communicate among themselves for various reasons, which are not of interest here, and/or with a harvester device that might pass the area of interest for collecting the stored seismic data, and/or with one or more servers. In one embodiment, the wireless seismic nodes are configured to receive GPS signals for providing a time stamp to the recorded data and/or also for obtaining the geographical coordinates of the node. All these acts use up the limited electrical energy stored by each node and eventually the battery of the node gets depleted and need to be recharged.

When a wireless seismic node runs low on power, it needs intervention from the operator of the seismic survey. Typically, for such situations, the operator of the seismic survey either collects all the seismic nodes and takes them to a maintenance facility for recharging them, or the operator drives a vehicle equipped with a power source, connects this power source to each seismic node, and recharges their batteries. [1] discloses a system that is configured to receive plural identical wireless seismic nodes. [2] discloses a docking station that that can quickly receive different types of seismic nodes for battery recharging and data downloading. However, the docking station cannot be easily moved to various locations in the survey area and the operator of the seismic survey has to gather the seismic nodes and take them to the docking station embedded in a truck for executing the required operations such as recharging them and/or collecting their data.

Some docking systems might be brought by an operator on the survey area near to the nodes to place them into the docking system for recharging them and/or collecting their data. However, as for the docking station disclosed in above cited application [2], when the nodes are connected into the docking system and that the docking system is running, for instance for charging the nodes and/or collecting the data, the docking system is intended to remain static.

Another possibility is to have a mobile docking station, as described in [3], where a tractor trailer or similar large moving vehicle is provided with plural docks, see FIG. 4 in this reference, and the tractor trailer is brought into the field, next to the nodes so that the operator of the survey simply takes the nodes and plug them into a dock of the tractor trailer for charging and/or data exchange. However, such a system is cumbersome because there are land regions where the seismic survey is taking place that are not accessible by tractor trailers or even trucks and for these situations, it is impossible to bring the docks close to the nodes.

There is thus a need to provide a new docking device that enables to overcome at least part of the drawbacks of the known docking systems.

BRIEF SUMMARY OF THE INVENTION

According to an embodiment, there is a mobile docking device configured to receive seismic acquisition units. The mobile docking device includes a container having a front opening, a docking module located within the container, the docking module having plural docking bays, each docking bay being configured to receive one of the seismic acquisition units through the front opening, a removable front wall configured to be attached to the container to cover the front opening to secure the seismic acquisition units, and handles attached to the container. The removable front wall biases the seismic acquisition units to maintain a direct electrical connection between tubular pins of the plural docking bays and pins of the seismic acquisition units during transport of the mobile docking device.

According to another embodiment, there is a seismic data exchange system configured to exchange seismic data, and the seismic data exchange system includes analog seismic acquisition units, digital seismic acquisition units that share a same base with the analog seismic acquisition units, but have a different cover, and a mobile docking device configured to receive the analog and digital seismic acquisition units. The mobile docking device has handles to allow a movement of the analog and digital seismic acquisition units from one location to another while being charged. The mobile docking device has a removable front wall configured to allow, in an open state, the analog and digital seismic acquisition units to be attached to corresponding docking bays located within the mobile docking device, and to be secured, in a closed state, to the corresponding docking bays when moving from the one location to another.

According to yet another embodiment, there is a method for charging and data harvesting seismic acquisition units within a mobile docking device during a transport of the mobile docking device from one location to another. The method includes collecting seismic acquisition units from a field, placing the seismic acquisition units in the mobile docking device, which includes a container that houses a charging and data harvesting system and plural docking bays, locking the seismic acquisition units to corresponding docking bays with an attachment system and with a front wall to prevent disconnection of these seismic acquisition units, powering on the mobile docking device to proceed to charging or data harvesting of the seismic acquisition units, and moving the mobile docking device to another location while charging and data harvesting.

BRIEF DESCRIPTION OF THE DRAWINGS

For a more complete understanding of the present invention, reference is now made to the following descriptions taken in conjunction with the accompanying drawings, in which:

FIG. 1 illustrates a land seismic acquisition system that uses wireless seismic nodes for collecting seismic data according to a state-of-the-art embodiment;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2A:
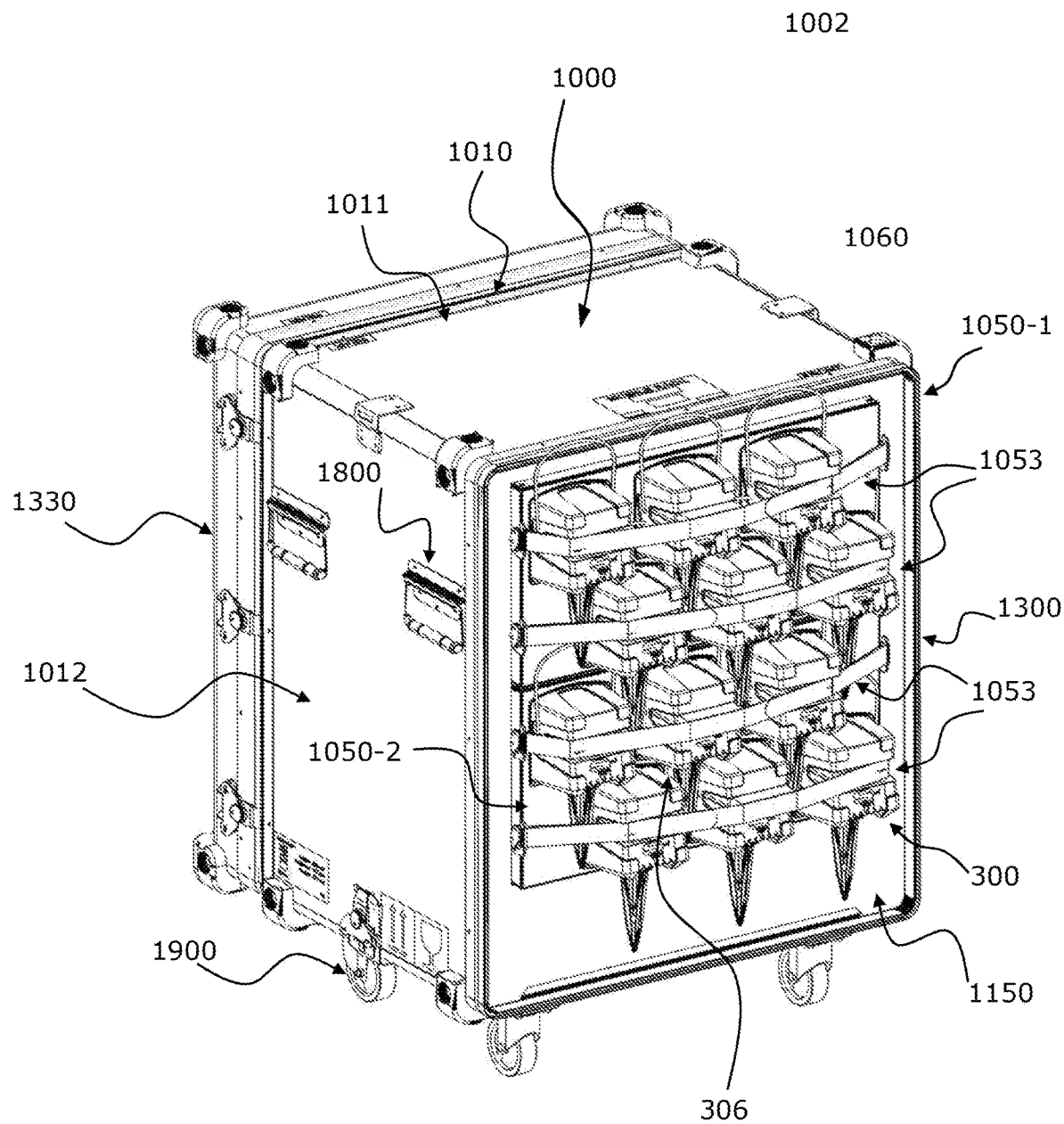
FIGS. 2A, 2B and 2C illustrate a mobile docking device according to an embodiment of the invention.
Figure 2B:
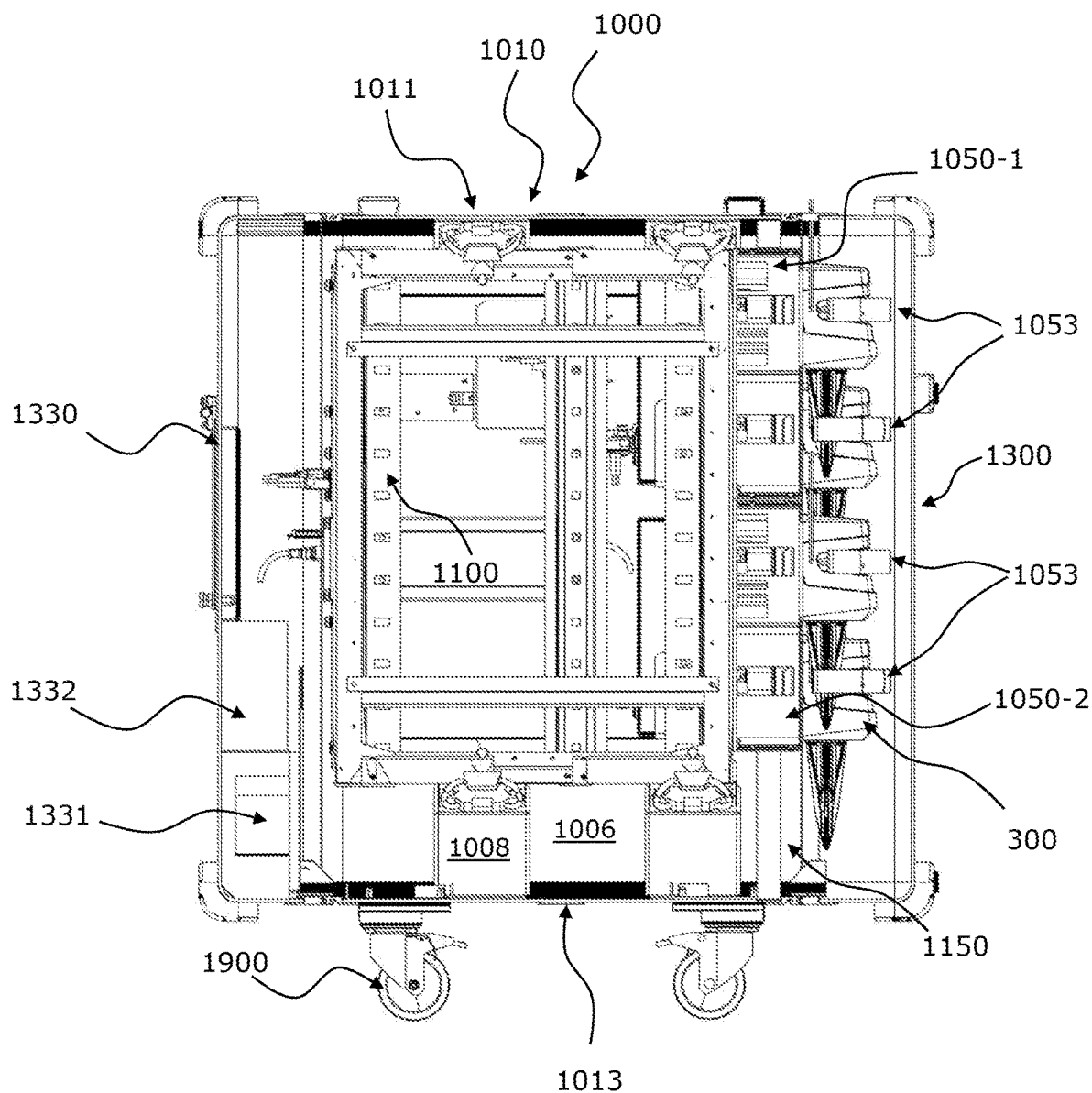
Figure 2C:
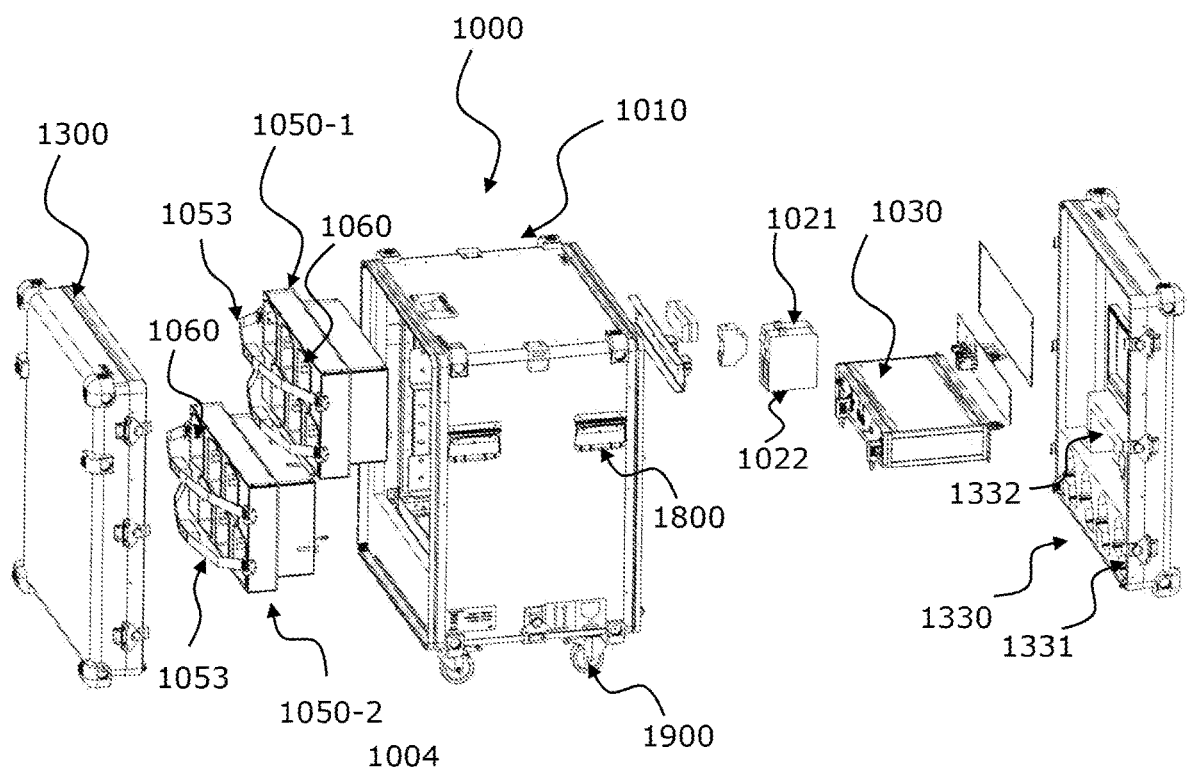

According to an embodiment and as illustrated at FIGS. 2A, 2B and 2C, a mobile docking device 1000 includes a container or box 1010. The container 1010 houses a charging and data harvesting system, and plural docking bays 1060. The docking bays 1060 are configured to receive seismic acquisition units 300 or 400, also referred to as seismic nodes, for connecting the seismic nodes to the charging and data harvesting system. The charging and data harvesting system can include a harvester-charger module (HCM) 1030 (see FIG. 2C) as described hereafter. All these elements together form a seismic data exchange system 1002.

The docking device 1000 includes at least one docking module 1050 that includes at least some of the docking bays 1060. The at least one docking module 1050 comprises a casing or housing 1510 (see FIG. 11) to which the docking bays 1060 are fixed as detailed hereafter. The at least one docking module 1050 also comprises a support housing 1640 (see FIG. 11) that includes electric or electronic components to which the docking bays 1060 are connected, as detailed hereafter, to enable the connection of the seismic nodes to the charger and harvester system. In the illustrated embodiments, the container includes a plurality of docking modules. Preferably each docking module has the same number of docking bays.

According to embodiments, the mobile docking device comprises a frame structure 1100 (see FIG. 2B) that is housed in the container 1010 and to which are fixed at least part of the charging and data harvesting system. Other electric or electronic components can also be fixed to the frame structure, for example, a power storage unit 1006 for charging the seismic nodes when the mobile docking device is moved from one location to another location. In this or another embodiment, a wireless communication unit 1008 may also be attached to the frame structure and also be used while the mobile docking device is moved, for transmitting the seismic data downloaded from the seismic nodes to a remote server. In this way, there is no downtime for the mobile docking station, in terms of seismic data exchange and power charging of the nodes, while the mobile docking station is moved from one location to another one. Note that the mobile docking device 1000 discussed herein is not attached to motorized vehicle for moving it from one location to another and thus, there is no need for power from the motorized vehicle to support the various operations performed by the docking device while on the move on its own means. The docking modules 1050 can also be fixed to the frame structure 1100.

According to embodiments and as illustrated in FIGS. 2A to 2C, each docking module 1050 is oriented so that the openings of the receptacles 1062 of the docking bays 1060 that receive the seismic nodes, are directed towards the exterior (a lateral side) of the container 1010. Thus, the operator can easily access the docking bays or the seismic nodes after opening a front wall 1300 of the container 1010 (see FIGS. 2B and 2C), to connect nodes 300, 400 into the docking bays with the charging and data harvesting system or to remove the seismic nodes from the container. More specifically, as shown in FIG. 2C, the front wall 1300 attaches to the container 1010 to close a front opening 1004 of the container, and implicitly to close the nodes 300 and ensure that the nodes do not disconnect or do not fall outside the mobile docking device 1000 when moved from one location to another one. In addition, the front wall 1300 biases the seismic acquisition units 300 and/or 400 to maintain a direct electrical connection between tubular pins of the docking bays 1060 (which are discussed later) and pins of the seismic acquisition units (which are also discussed later) during transport of the mobile docking device. These features of the mobile docking device are discussed in more detail later.

In the preferred illustrated embodiment of FIGS. 2A-2C, the mobile docking device includes two docking modules 1050-1, 1050-2, fixed into the container 1010 on the frame structure 1100 attached into the container. Each docking module 1050-1, 1050-2 includes a plurality of rows of the docking bays 1060, for instance two rows of docking bays with three docking bays per row. Each row is preferably positioned offset a next row to enable a spike 306 of a seismic node placed in a docking bay of one row to extend between the seismic nodes placed in docking bays of a next row.

The mobile docking device comprises an attachment system configured to maintain in position the seismic nodes that are received in the docking bays, to prevent disconnection of these seismic acquisition units, in particular during a transport or a movement of the mobile docking device. Note that the mobile docking device 1000 may have its own wheels 1900, so that the docking device can be moved from one location to another location of the seismic survey without the need of a tractor trailer or truck, i.e., without the need of a motorized vehicle. This also means that the mobile docking device is small enough so that one or two persons can carry it, if no wheels are present, or push it, if the wheels are used, from one location to another location and achieve this translation only based on the energy spent by the one or two persons, with or without the wheels attached to the docking device. These specific features of the docking device, i.e., small size so that a person or two can carry it, i.e., the docking device is portable with no need of a motorized device, or, if the wheels are installed, the docking device can be wheeled to another location, define the meaning of the term "mobile docking device." This means that one skilled in the art, when reading this disclosure, would not associate the novel "mobile docking device" with a tractor trailer or an attached trailer, or the bed of a truck, or any platform that is itself motorized or designed to be pushed by a motorized vehicle for moving from one location to another one. Due to the small size of the mobile docking device (e.g., about 50 to 60 kg) relative to a tractor trailer (couple of tons), such mobile docking device can be more readily moved in the field to a desired location. Also, note that the mobile docking device is moved by an operator of the survey by simply carrying it or pushing it, and thus, there is no need for a vehicle for moving the docking device. This confers to the mobile docking device more agility and ability to engage various field conditions which sometimes are not favorable for a large truck or tractor trailer.

Figure 7:
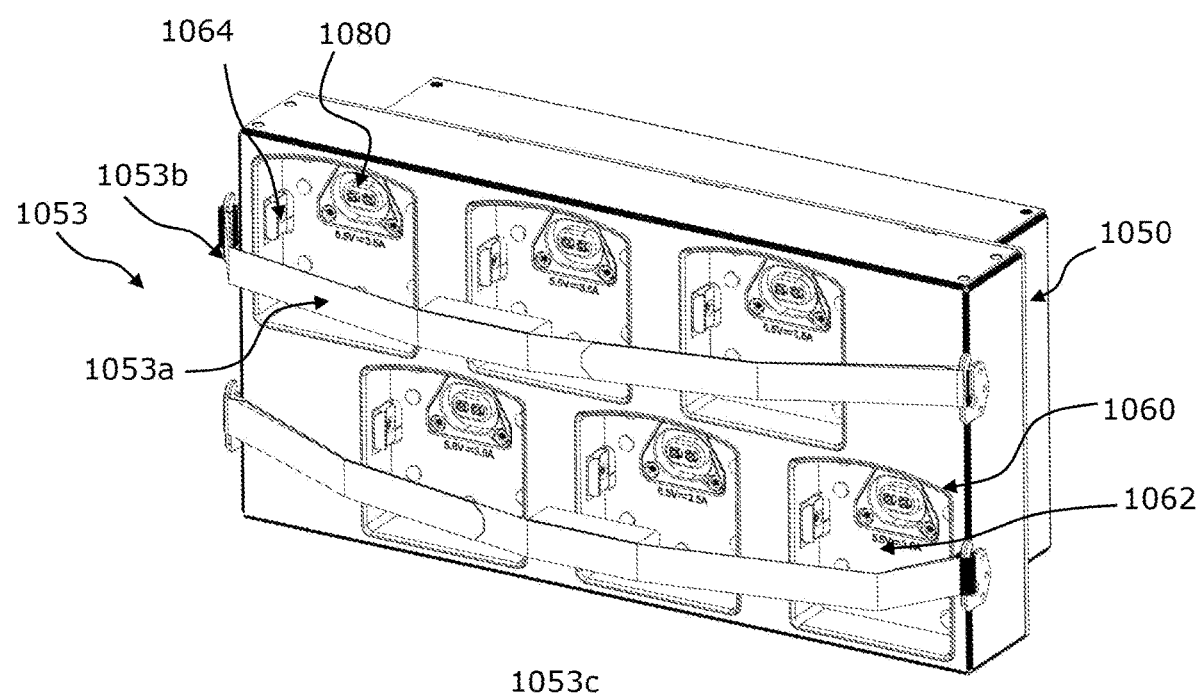
FIG. 7 illustrates a docking module of the mobile docking device of FIGS. 2A, 2B and 2C that is configured to receive analog seismic nodes.
Figure 8:
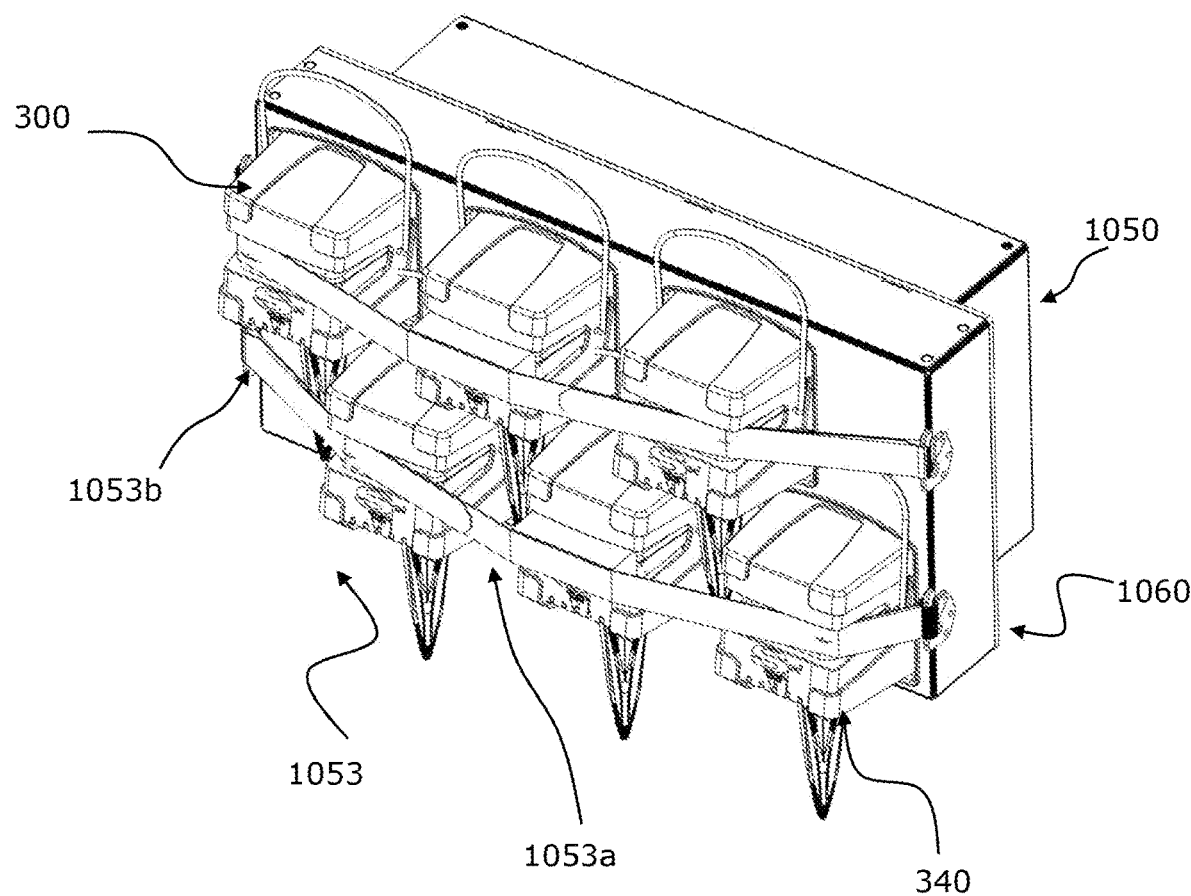
FIG. 8 shows a docking module of a mobile docking device according to an embodiment of the invention, and seismic nodes placed with their spikes into docking bays of the docking module.

According to a preferred embodiment the attachment system comprises a strap system. As illustrated at FIG. 7, the docking device can comprise a strap system 1053 for each docking module 1050. In particular, the strap system 1053 can comprise a strap device for each row of docking bays 1060. The strap device can be fixed at opposite sides of the docking module 1050, at opposite extremities of a corresponding row of docking bays 1060.

The strap device can include a strap 1053a and an adjustment device 1053b, such as a buckle-loop adjusting device, configured to adjust the useful length of the strap 1053a, to have the strap 1053a strained against the nodes 300 or 400 of the rows of docking bays 1060. In one embodiment, as illustrated in FIG. 7 a gap block 1053c is attached to the strap 1053a to press against a middle node 300 or 400 as the adjacent nodes may push the strap 1053a away from the middle node. In this way, the strap 1053a directly presses against each node in the docking module 1050. FIG. 7 further shows that each docking bay 1060 is configured to receive a node 300 or 400 and fix it in place by at least three elements: the strap 1053a, a pair of tabs 1064 that are discussed later, and a port 1070 or 1080, also discussed later. All these three elements directly contact the node 300 or 400 and help the node to remain in place in the corresponding docking bay as the docking device 1000 is carried or wheeled from one location to another one. This feature ensures that data and/or power exchange between the node and the mobile docking device (more specifically, the data and power harvesting system 1030) continues as the docking device moves. As an additional feature for maintaining the nodes in place in their docking bay, the above discussed front wall 1300 is shaped to bias the nodes against their corresponding docking bays to prevent them from popping out of the docking bays when the mobile docking device is moved.

In the illustrated embodiment, the useful length of the strap 1053a corresponds to the length of the strap that is under tension thanks to the adjustment device 1053b. This length is adjusted to enable to strain the strap 1053a onto the seismic nodes 300. According to another embodiment illustrated at FIGS. 2A-2C and FIGS. 7 and 8, each strap is configured to extend through a trench type depression 340 of each node of a row of nodes placed in a corresponding row of receptacle 1062 of docking bays 1060. Example of trench type depression 340 is described hereafter. The trench type depression is preferably formed around three sides of a base of the node as visible at FIGS. 3, 4A-B and 9B.

In the illustrated embodiment, the strap system is adapted to secure the position of the seismic nodes placed in each row of three docking bays. The strap system can also be used to secure the position of a fewer or larger number of seismic nodes per row, such as one or two seismic nodes by row only.

Figure 10:
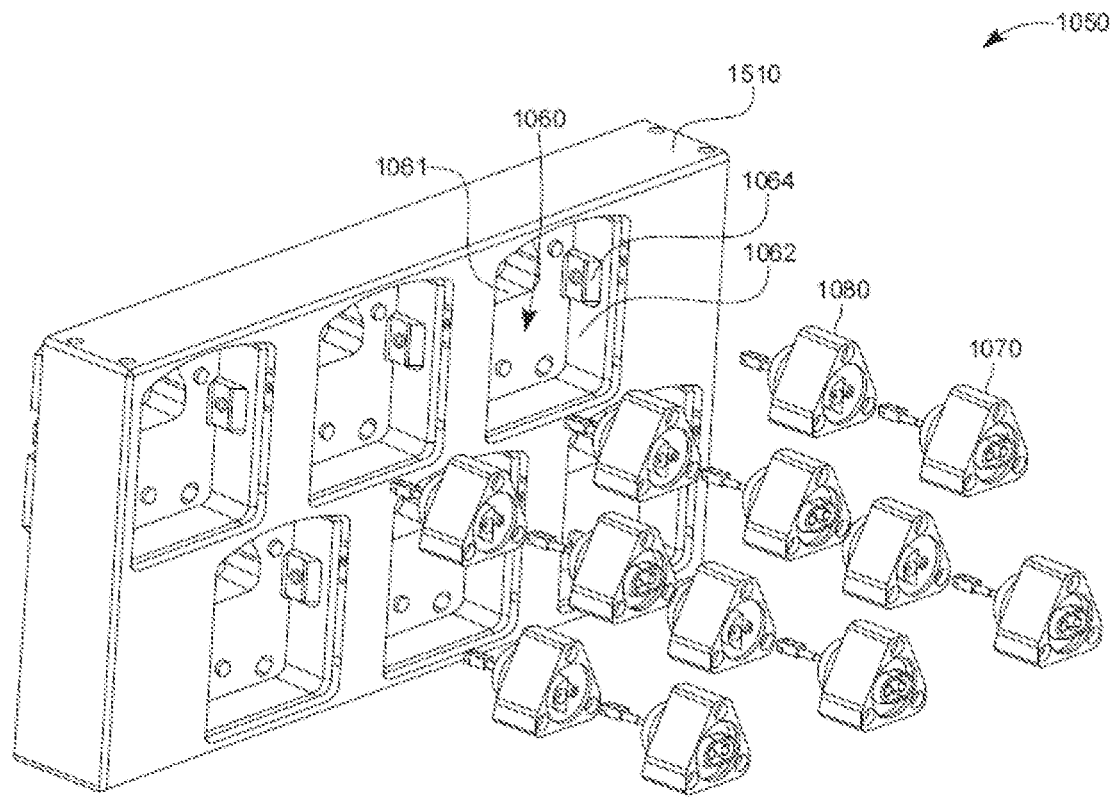
FIG. 10 illustrates a docking module of a mobile docking device according to an embodiment of the invention, and corresponding digital and analog ports.

As detailed below, each docking bay includes a receptacle 1062 configured to receive a seismic node 300, 400. According to embodiments, each docking bay can receive selectively a digital or analog node. The receptacle 1062 comprises a connecting system to connect said seismic node to the charging and data harvesting system 1030. According to embodiments, the connecting system includes a port. The port can be a digital port for connecting a digital seismic node or an analog port for connecting an analog seismic node. As illustrated in the embodiment of FIG. 10, the receptacle 1062 of a docking bay 1060 has a recess 1061, and the recess 1061 is configured to accept both a digital port 1070 and an analog port 1080, sequentially.

The attachment system is arranged to prevent an unwanted movement of the seismic nodes 300 (sensors) with regard to a receptacle of the bay and thus, avoid disconnection of the seismic nodes from the connecting system that connects the seismic nodes to the charging and data harvesting system of the docking device.

The attachment system makes thus the docking device compatible with on-road constraints (that can produce vibrations/shocks) by maintaining the seismic nodes in position into the docking bays inside the container to avoid unwished disconnection and enable to keep ongoing the harvesting and/or charging of the nodes. The docking device can continue to operate for charging and/or harvesting nodes connected to docking bays, during transport of the mobile docking device from one location to another.

As illustrated at FIGS. 2A-2C, the container 1010 comprises a main body having a top wall 1011, a bottom wall 1013, and lateral opposite walls 1012 that extend from said bottom wall 1013 to said top wall 1011. The container 1010 further has the front wall 1300 that can be attached to the main body of the container with a hinge, so that the front wall swing closed or open, or with other means that make the front wall to not swing. The removable front wall 1300 extends from one lateral wall 1012 to the opposite lateral wall 1012.

The removable front wall 1300 can be moved between:
an open position wherein the docking bays 1060 are accessible from the exterior of the container to place nodes into the corresponding docking bays 1060 or to remove nodes previously placed into the corresponding docking bays 1060; and
a closed position wherein the docking bays 1060 are covered by the front wall that prevents access from the exterior to the docking bays 1060, and thus to the nodes that have been placed into the docking bays 1060. Thus, for this position, the nodes are secured within the corresponding docking bays and it is not possible to remove them. This is advantageous as the mobile docking device is moved from one location to another to prevent the accidental detachment of the node from the docking device. The removable front wall also ensures that no person removes by mistake the nodes from their docking bays. According to a particular embodiment, the front wall 1300 is fully removable, although it might be hinged.

The front wall 1300 can have a hollow shape to let at least part of the docking modules or the seismic nodes extend into the space delimited by the front wall. The other walls of the container can thus form, with the front wall, a shell that envelop various components of the docking device included in the container, as illustrated in FIG. 2B. In one embodiment, the hollow shape of the front wall 1300 is configured to exactly match an outside profile of the nodes 300 or 400, so that when the front wall 1300 is closed, it is in direct contact with the nodes, thus preventing them from moving inside the docking bays when the mobile docking device is moved from one location to another one. This feature ensures that an intimate electrical contact between the pins of the nodes and the tubular pins of the docking bays is not disturbed by a rough road that is followed by the mobile docking device.

According to a particular embodiment, the container 1010 further has a rear wall 1330 that extends from one of the lateral walls to the opposite lateral wall, in a closed position. The rear wall 1330 preferably has at least one storage cavity 1331 to store removable wheels 1900. The rear wall 1330 can also have at least one cavity 1332 to store cables. The rear wall 1330 can be moved between a closed position and an open position that enables an operator to have access to components housed in the container, such as a network device 1020, powering device(s), and the charger and harvester module 1030 as detailed hereafter and as visible at FIG. 13B. According to a particular embodiment, the rear wall 1330 is fully removable and not hinged.

Figure 13A:
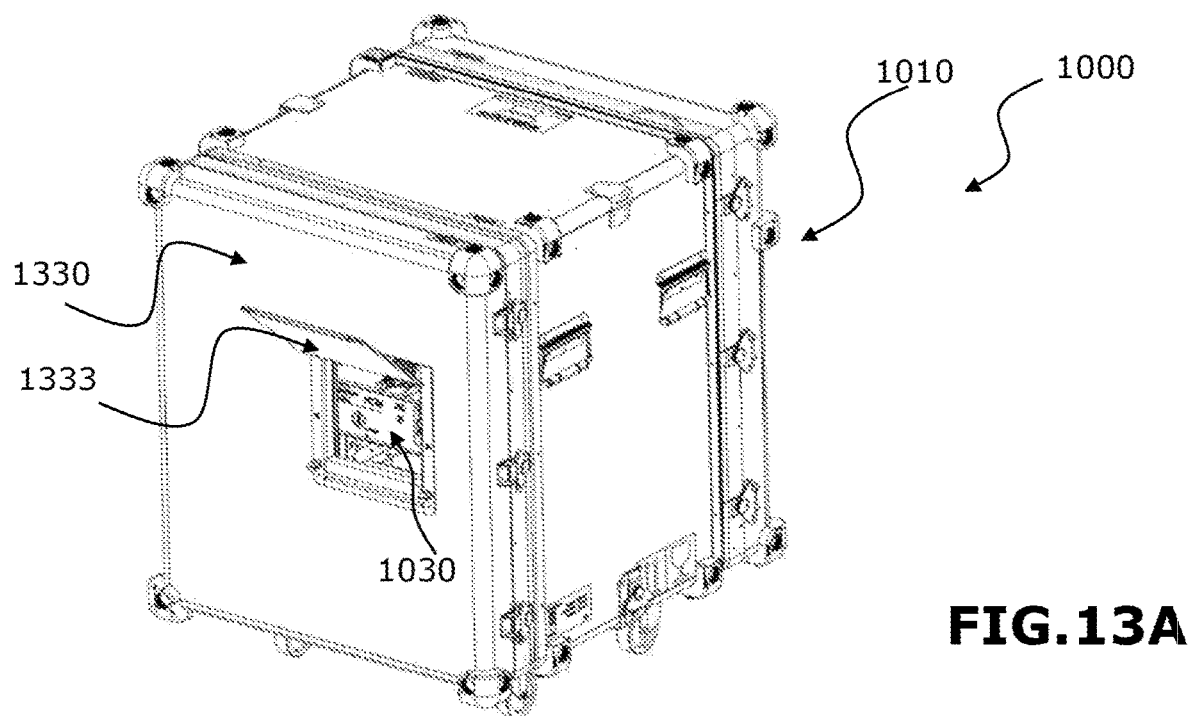
FIG. 13A is a perspective view of a mobile docking device according to an embodiment of the invention, showing the rear wall of the container that is provided with a trapdoor.
Figure 13B:
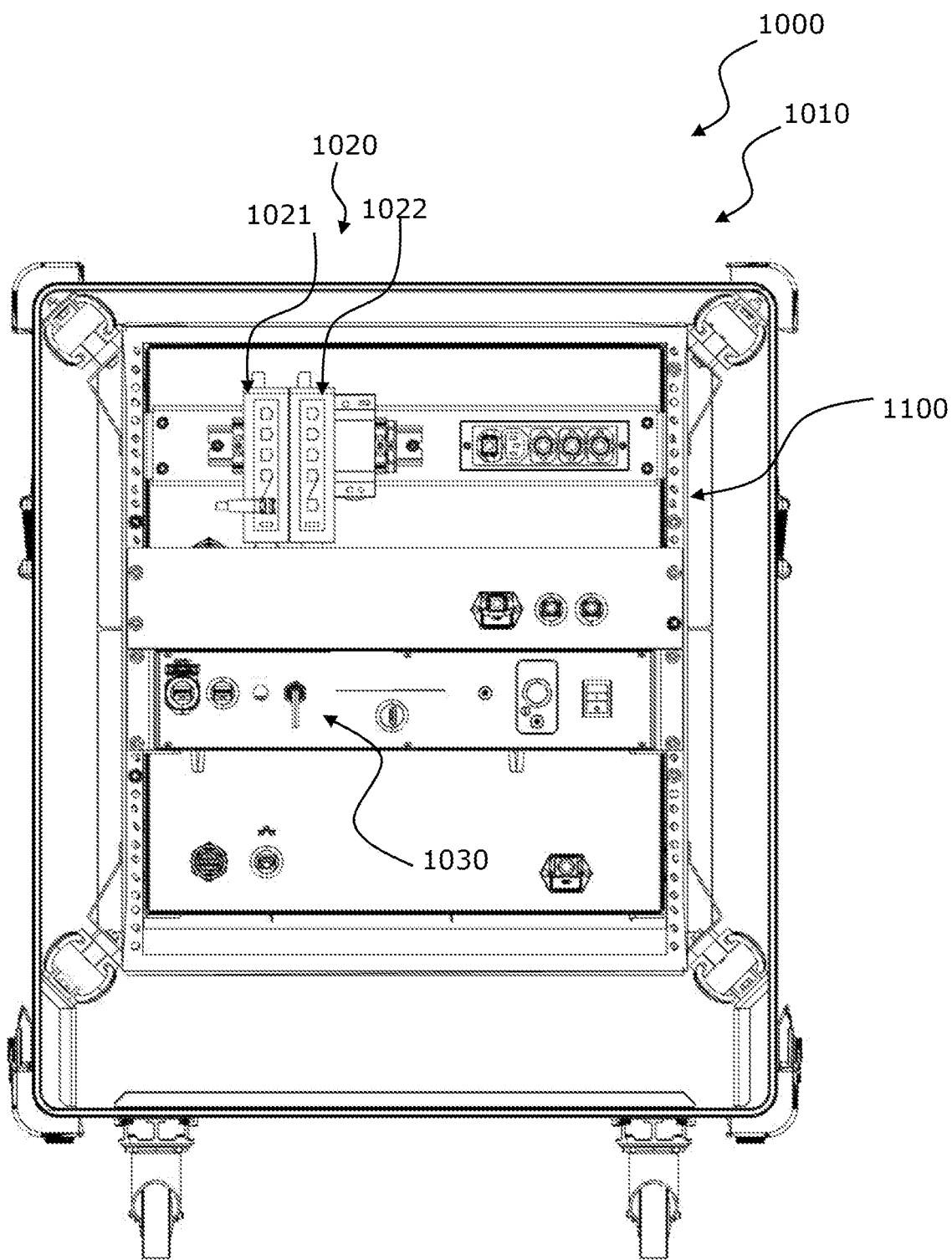
FIG. 13B is a rear view of the interior of the mobile docking device of FIG. 13A.

As illustrated at FIG. 13A, the rear wall 1330 includes a trapdoor 1333 to have access to a power on module and external ethernet connections 1020 (FIG. 13B) that enable to connect a plurality of docking devices as explained hereafter.

According to a particular aspect, the mobile docking device can include an attachment frame 1150 (see FIG. 2A) that is fixed to a main body of the container defined by the bottom wall, the top wall and lateral walls of the container. The attachment frame is applied on a perimeter defined by edges of the bottom wall, the top wall and lateral walls of the container. The docking modules 1050 can be fixed to the attachment frame 1150.

According to embodiments, the container 1010 includes a damping system for absorbing vibrations and/or shocks that the container is susceptible to be exposed to during a moving of said container from one location to another location. The damping system can include cable shock absorbers located in the corners of the attachment frame 1150 which supports the electronic devices.

According to an embodiment, the docking device integrates plural docking bays that can be reconfigured for accepting different types of seismic nodes. Each docking bay has a docking port, which is configured to establish electrical contact with a corresponding wireless, autonomous, seismic node. The docking port can be quickly removed from the docking bay and another docking port, which is appropriate for another seismic node, may be attached to the docking bay for mating with this another seismic node. In one application, each docking port includes two electrical contacts on one side, for mating with the appropriate seismic node, and a same electrical connection for connecting to a docking module of the docking device. The electrical connection is configured to slide in and out of the docking module while the docking port may be attached with screws to the docking module. The docking bay has an engagement mechanism for mechanically connecting to the seismic node so that the established electrical connection between the docking port of the docking bay and the seismic node is maintained. No assembly or disassembly of the seismic node is involved in the docking or undocking process. In other words, no physical access to the interior of the seismic node is required for recharging the battery and/or downloading the seismic data from the seismic node. The docking bay is configured to not only electrically recharge a battery of the seismic node, but also to harvest the seismic data from the seismic node, and, according to embodiments, to test the seismic node(s), to update the firmware and/or reconfigure the software of the seismic node(s). A single, integrated, control unit of the docking device can be configured to achieve all these functions with one docking operation. Details of the docking device are now discussed with regard to the figures.

Figure 3:
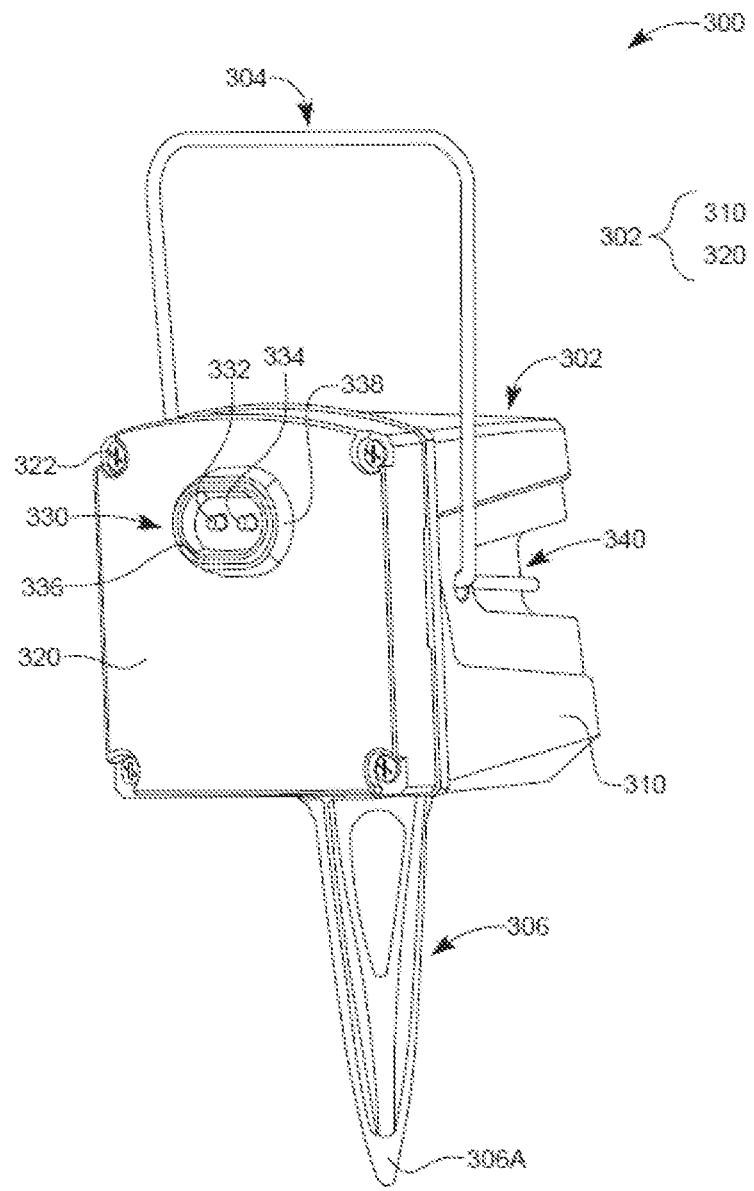
FIG. 3 illustrates an autonomous, wireless, digital seismic node for collecting seismic data that can be used with a docking device according to an embodiment of the invention.

Before discussing further details of the novel docking device, a brief discussion of two types of wireless, autonomous, seismic nodes is believed to be in order. A wireless, autonomous, digital field unit (DFU) 300, or digital node is shown in FIG. 3. This seismic node is configured to use a transceiver and antenna for communications (no wires), i.e., wireless, and also to operate independent of a general control unit of the entire seismic survey, i.e., autonomous. The digital node 300 has a housing 302, a handle 304 (for example, a piece of rope) attached to the housing 302, and a spike 306 removably attached to the housing 302. The handle 304 is optional and is configured to provide the operator of the node with a means for carrying the digital node. The spike 306 is configured to have a sharp tip 306A for penetrating the ground, for achieving a good coupling between the ground and the seismic sensor (for example, MEMS sensor) located inside the housing.

The housing 302 is made of two components, a base 310 forming a chamber 312 and a cover 320. The cover 320 is attached to the base 310 so that the housing 302 forms a sealed, inside chamber 312. The cover 320 can be attached in various ways to the base 310. The embodiment illustrated in FIG. 3 shows the cover being attached with screws 322 to the base 310. Any type of screws may be used. In this embodiment, four screws are used. However, those skilled in the art would understand that more or less screws may be used. Note that the handle 304 is attached to the base 310 and not to the cover 320 as the same base is used for other types of sensors, as discussed later. Also, the spike 306 is attached to the base. The cover 320 has in this embodiment only one element, an external connection plug 330, which is discussed in more detail later, and is configured to mate with a corresponding docking port of a docking bay of the docking device. The external connection plug 330 has first and second pins 332 and 334 for electrical connection to the docking port. The first and second pins 332 and 334 are surrounded by a protective skirt 336, which is configured not only to absorb shocks, but also to prevent water entering the chamber 312. In addition, the cover 320 has a rigid belt 338 formed around the protective skirt 336 to prevent any accidental impact to the pins 332 and 334.

The base 302 is shaped as a box with a trench type depression 340 formed around three sides of the box. The depression 340 is shaped to conform to the human hand so that the operator of the node can easily handle the node. This feature also suggests a size of the base 310 (less than 20 cm) for fitting the hand of the operator. In this way, the node is easy to handle. In one embodiment, the trench type depression 340 is used to fix the strap 1053a of the wheeled docking device 1000 for making sure that the node 300 or 400 does not move relative to its corresponding docking bay when the docking device is moved on its own wheels or is carried from one location to another.

The chamber 312 lodges the different electronic components for the seismic node, in particular electronic components which are preferably associated with damping means such as: one or more battery pack, a sensor, as e.g., MEMS (microelectromechanical system), an electronic circuit board including a controller, a processor, a memory device, at least an antenna, a transceiver, a GPS module.

Figure 4A:
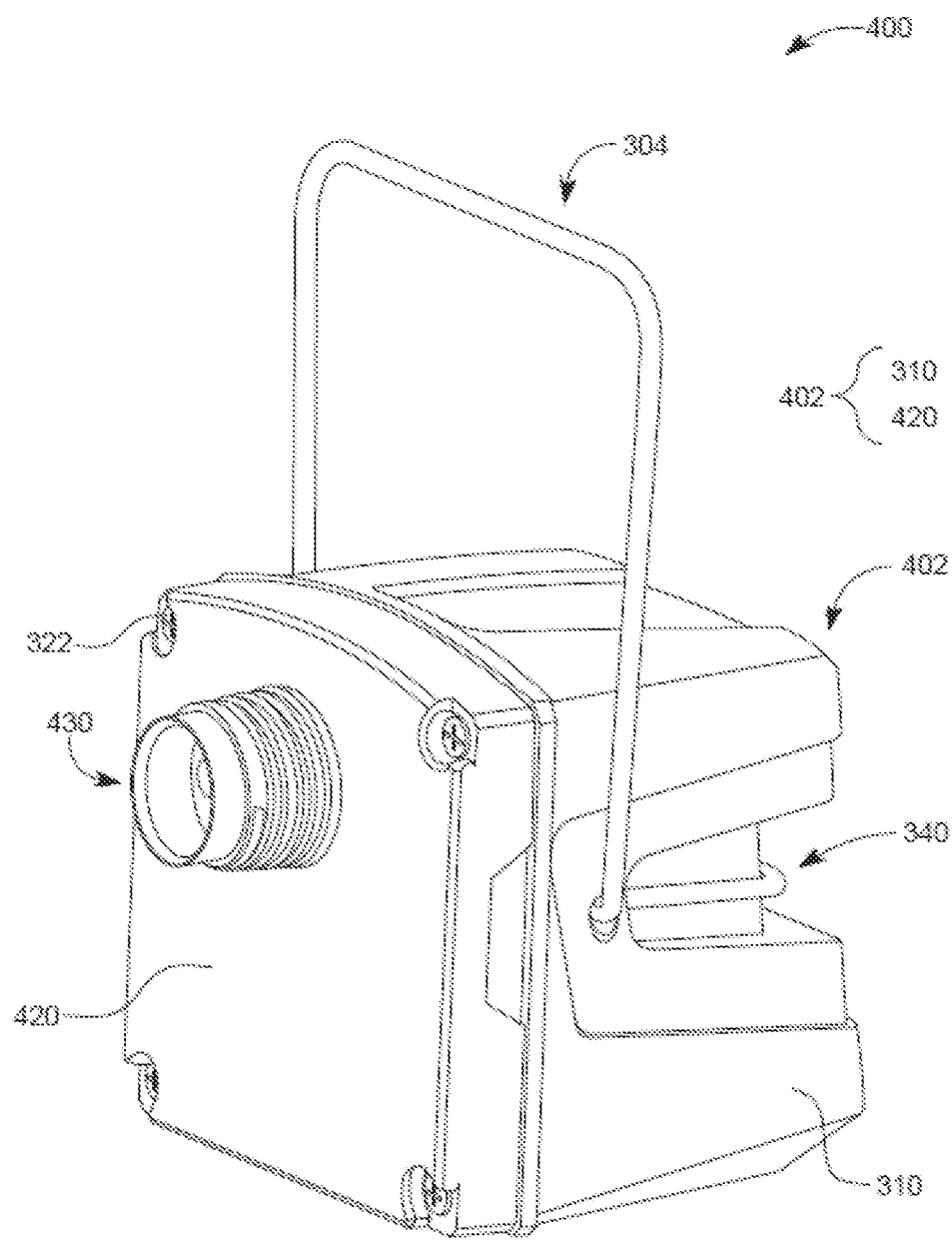
FIGS. 4A and 4B illustrate an autonomous, wireless, analog seismic node for collecting seismic data that can be used with a docking device according to an embodiment of the invention.
Figure 4B:
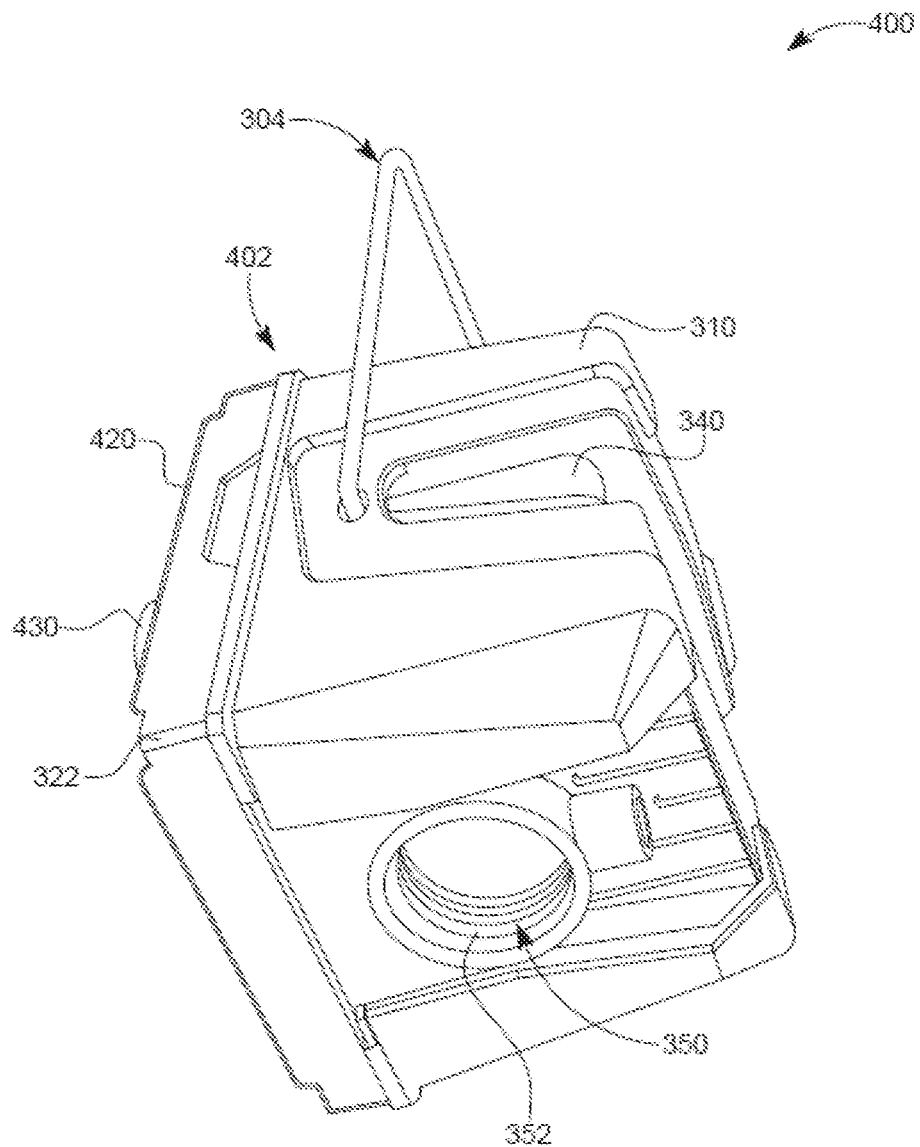

FIG. 4A shows a wireless, autonomous, analog field unit (AFU) node 400, or analog node herein, that shares the same base 310 as the DFU node 302. Thus, the AFU node 400 has a housing 402 that includes the base 310 and another cover 420. The handle 304 is the same handle as for the DFU node 302. The base 310 has the same depression 340 for easy handling by the operator. The cover 420 is attached with the same screws 322 to the base 310 as for the DFU node 302. However, the external connection plug 430 for the AFU node is different than the external connection plug 330 of the DFU node for reasons to be discussed later. FIG. 4B shows that the housing 402 has a receiving unit 350 formed into the base 302, and this receiving unit is configured to receive the spike 306. The receiving unit 350 may have threads 352 that match corresponding threads on the spike 306, so that the spike 306 can be removed as needed. For the ADU unit 400, no spike is need and thus, FIGS. 4A and 4B illustrate the housing 402 without the spike 306. Thus, the spike 306 may be added or removed from the base 310 on a need basis.

Figure 5:
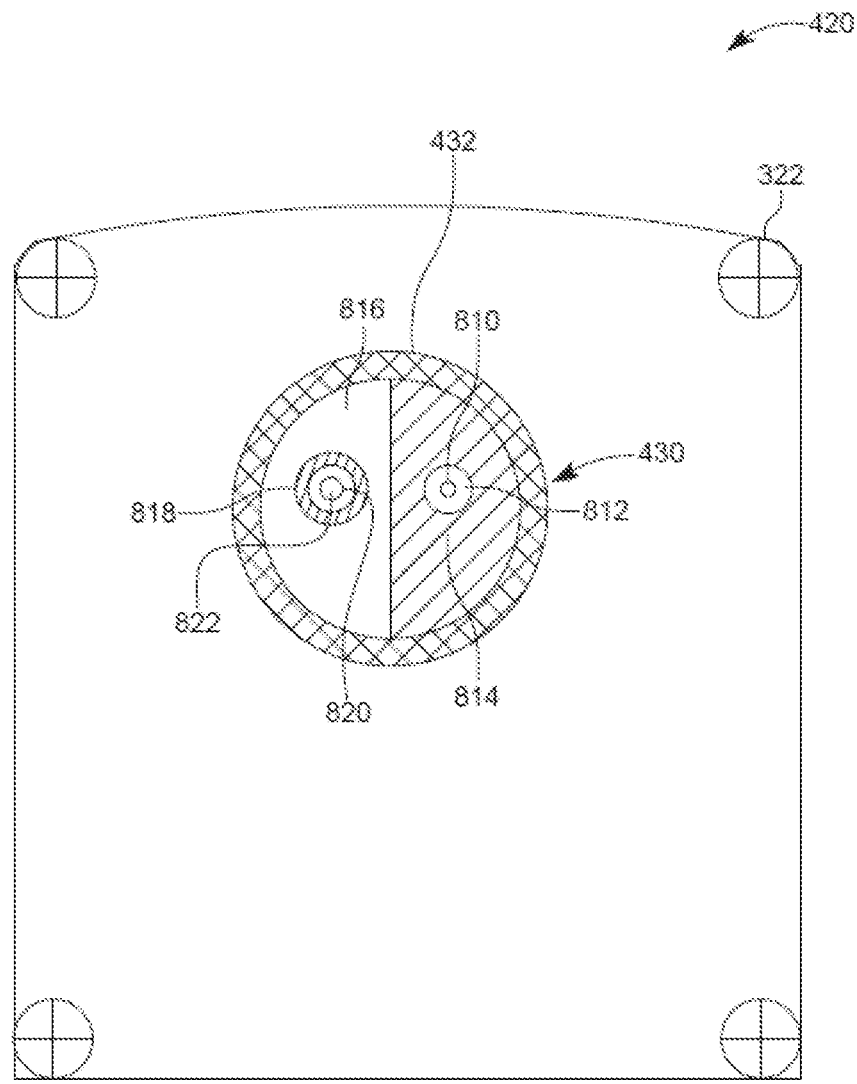
FIG. 5 illustrates a cover of the autonomous, wireless, analog seismic node that can be used with a docking device according to an embodiment of the invention.

The cover 420 is different from the cover 320 of the DFU unit 300 in terms of its external connection plug 330 that is configured to be attached with threads 432 to one or more external sensors (not shown), for example, geophones. The external connection plug 430 is shown in more detail in FIG. 5 and includes a pin 810 that is placed in a hole 812 formed in a half-body portion 814 of the connection plug 430. The half-body portion 814 of the connection plug occupies only half of the connection plug. The other half is a depression portion 816 from which a tubular part 818 raises to the same level as the half-body portion 814. A hole 820 with a tubular metal contact 822 is formed inside the tubular part 818 for receiving a pin from an external sensor, in particular the widely used KCK2 type connector even if other connectors may be used.

From the descriptions of the DFU node 300 and the AFU node 400 above, it is noted that regardless of the sensor type that needs to be deployed for a land seismic survey, the same base 310 is used. The unique and common base 310 of these different types of seismic nodes can be exploited by the mobile docking device 1000 (also called docking rack) illustrated in FIGS. 2A-2C, by being able to connect and process different types of seismic nodes.

According to embodiments and as illustrated at FIGS. 2A-2C, the container is provided with wheels 1900. Preferably the wheels can be removed and stored in a cavity 1331 managed inside a wall, such as the rear wall 1330 of the container.

According to embodiments, the container 1010 is provided with a handle system 1800 (see FIGS. 2A and 2C) to facilitate the moving of the container 1010 when carried by one or two persons or when translating on its own wheels 1900 by an operator. According to embodiments one or a plurality of walls of the container is provided with one or more handles. In particular, the combination of the wheels 1900 and of the handle system 1800 enables an operator to easily move the container 1010 on a desired location on the field without the help of a motorized vehicle. In other words, the wheels 1900 and handle system 1800 make the docking device 1000 autonomous and portable, i.e., free to move from one location to another one without the assistance of a motor or engine, based only on its own wheels. Such a configuration of the container prevents to have to use a crane or other manipulating device to move the container to a desired location. The container may be made from plastic, composite, or metal.

The mobile docking device 1000 includes a network connection device 1020 that may include various electronic components for connecting the docking device to the internet or to a communication network, private or public. For example, in one embodiment, the network connection device 1020 includes an ethernet switch for connection to the internet. In another embodiment, the network connection device 1020 may include a router, a satellite communication device, a base station connected to a wireless phone network, or any other device for connecting to the communication network.

Figure 6A:
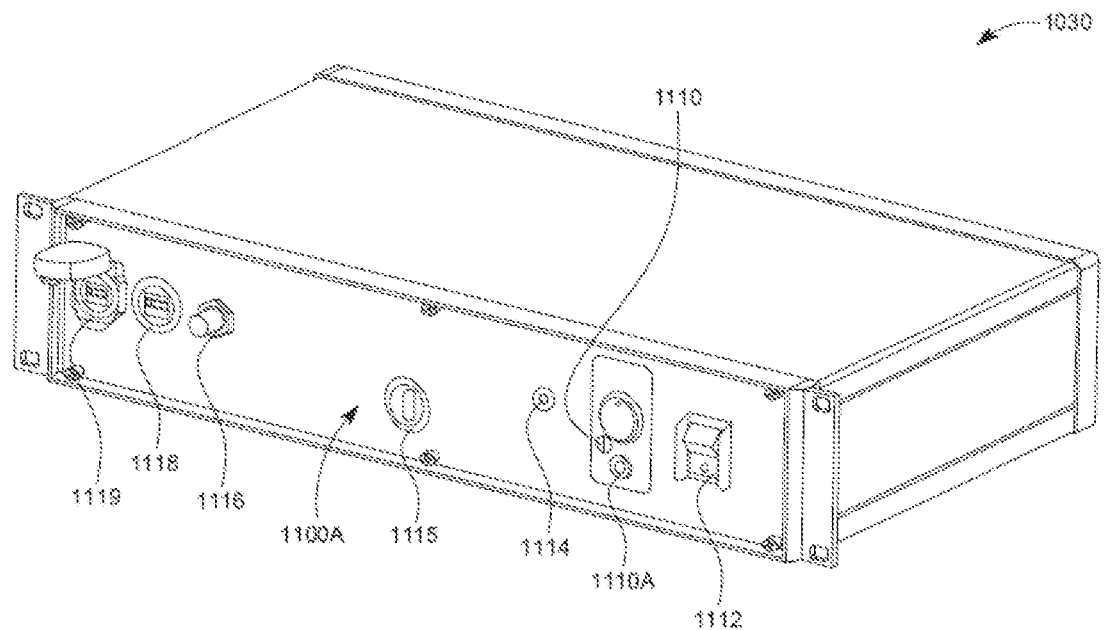
FIGS. 6A to 6D illustrate various details of a control unit of the docking device of FIGS. 2A, 2B and 2C.
Figure 6B:
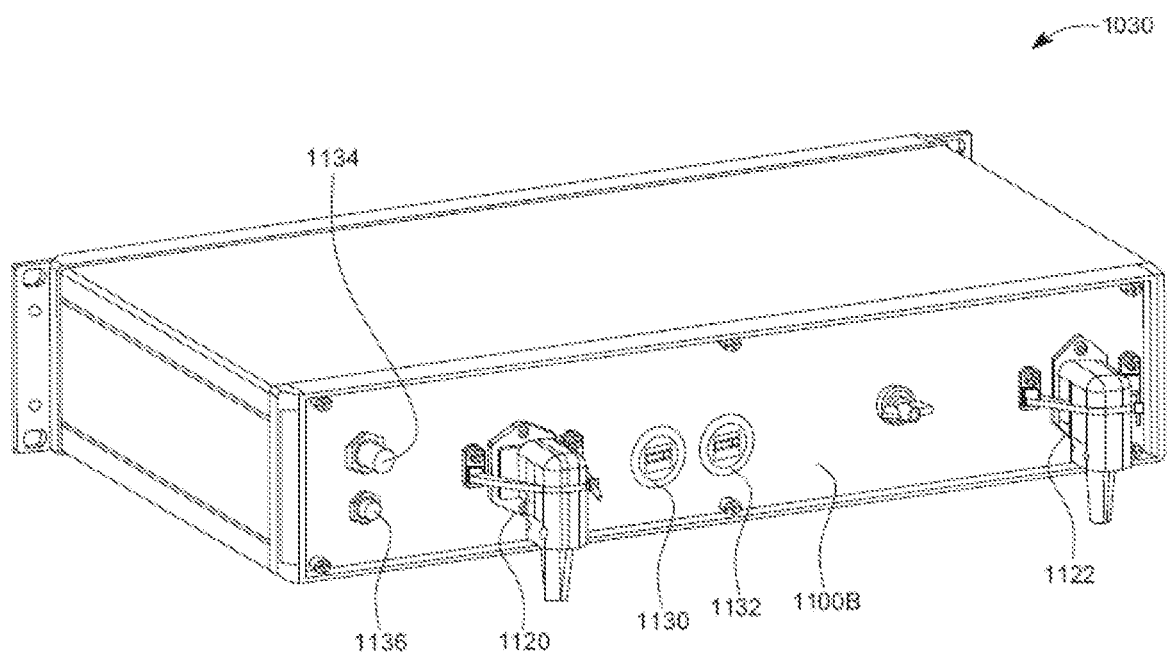
Figure 6C:
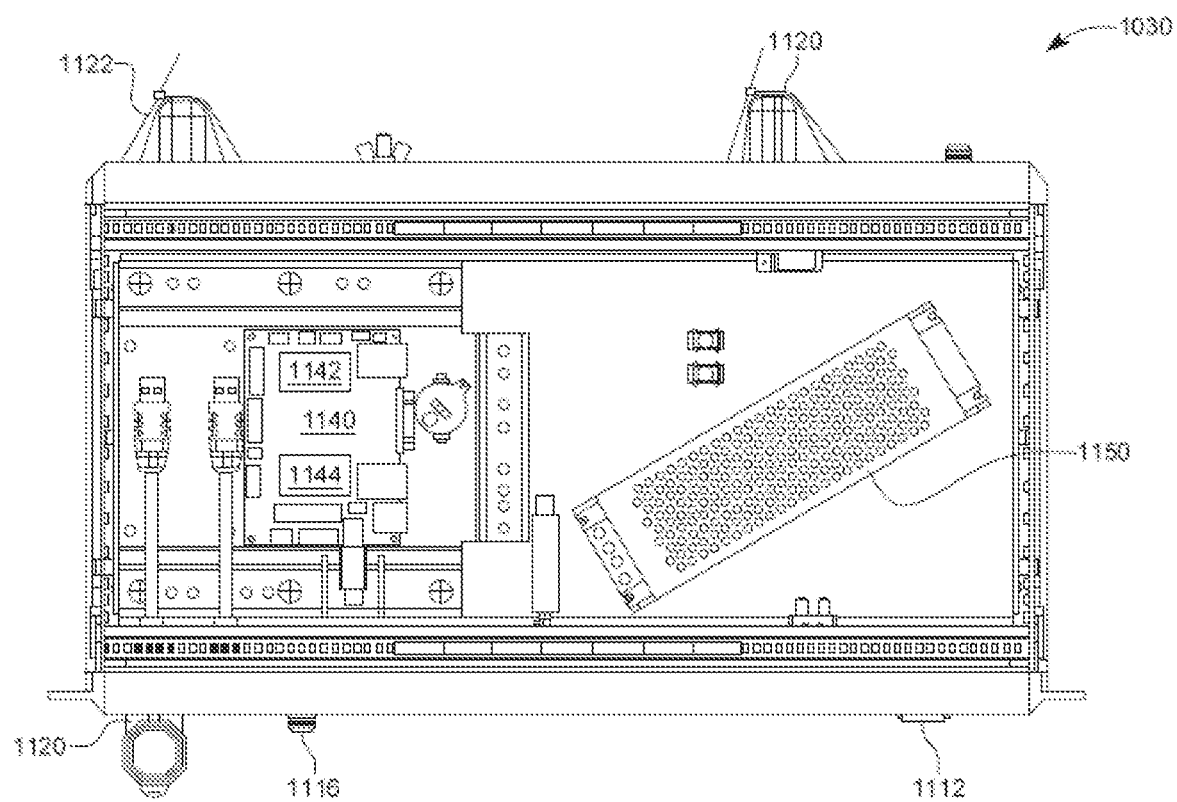
Figure 6D:
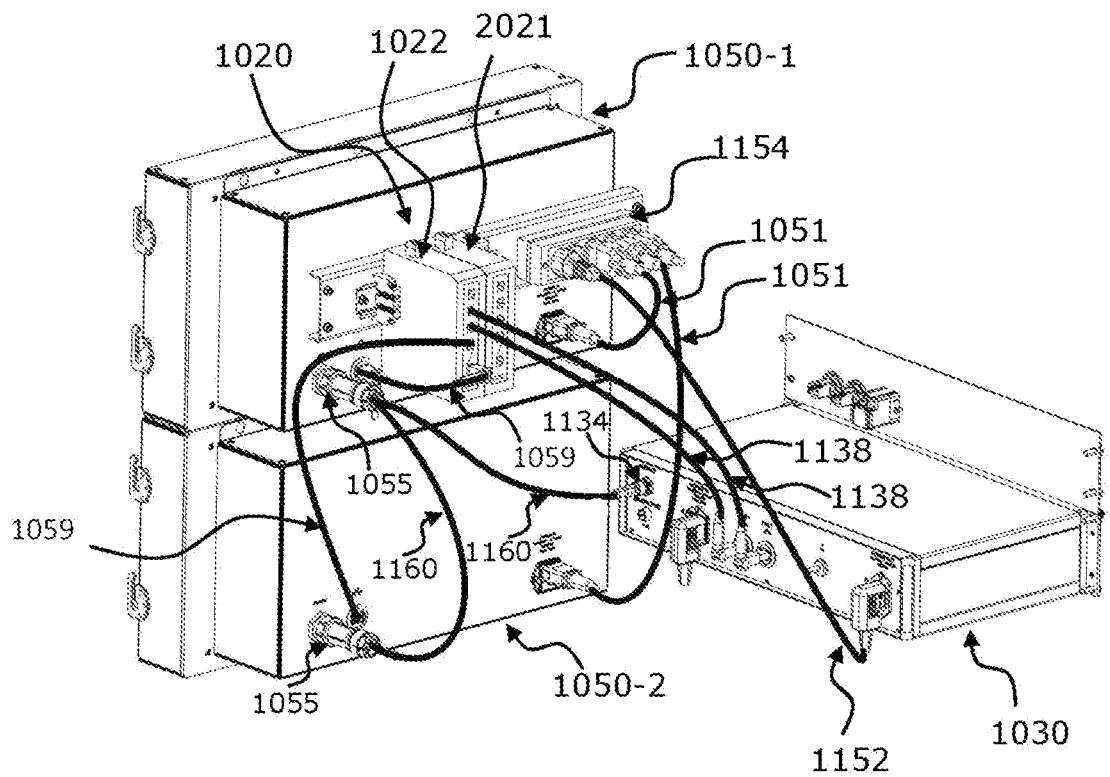

According to an embodiment, and as illustrated at FIG. 6D, the network connection device 1020 can include two ethernet switches. A first ethernet switch 1021 can be used for an internal network between a plurality of docking devices connected one to another. A second ethernet switch 1022 can be used for an external network to enable the docking device or a plurality of connected docking devices to communicate, for instance through a WIFI link antenna, with a remote server or terminal.

If the privacy of the data is of concern, then the network connection device 1020 may include encoding mechanisms (software and/or hardware) for encoding the data. The network connection device 1020 may also be configured to connect only to a private network that is run by the operator of the docking device 1000. In one embodiment, the network connection device 1020 is connected to a server. Note that the server may be located inside the docking device, in a vicinity of the docking device, or remotely located from the docking device.

Internally, the network connection device 1020 is connected to a harvester-charger module (HCM) 1030, which acts as the brain of the docking device 1000, and for this reason it is also called a control module. The internal structure of the HCM module 1030 is discussed later in more detail. In one embodiment, the HCM module 1030 is configured to slide along a dedicated rail into the container 1010. In another embodiment, the HCM module 1030 is attached with screws to the container 1010. In still another embodiment, the HCM module 1030 is configured to slide along the rail and then to be attached with screws to the container 1010.

FIG. 6A shows a front face of the HCM module 1030 having a plurality of ports and indicators, among which, there is an on/off switch 1110 for the module, a corresponding LED indicator 1110A that is illuminated when the HCM is powered and is dark when there is no power to the HCM, a docking device general power switch 1112, which is configured to switch off the power to all the elements of the docking device 1000, another LED indicator 1114 that is configured to show a status of the HCM module, i.e., if there is any problem with the module, a video port 1115 for providing, for example, a video signal associated with the docking device, a power port 1116 for a monitor to be discussed later, a fast communication port 1118 for connecting to the monitor, and a USB port 1119 for servicing the HCM module. Those skilled in the art would understand that more or less ports and indicators may be added to the HCM module or these ports may be redistributed on another face of the module.

FIG. 6B shows a back face 1100B of the HCM module 1030 and this face also holds plural ports. For example, the back face includes a power in port 1120 that receives external electrical power. This power is then transmitted to the power out port 1122 for supplying the electrical power to the other elements of the docking device 1000. The power switch 1112 shown in FIG. 6A is configured to turn on and off the electrical connection between the port 1120 and the port 1122. The back face 1100B may further include a first network port 1130 for connecting to the network connection device 1020, and a second network port 1132, which also may be connected to the network connection device 1020, or to other elements of the docking device 1000, as shown in FIG. 6B. The back face may also have a power out port 1134 for service, for example, a 12 V output connector for service power supply, and optionally, a fuse 1136 for the power out port 1134.

FIG. 6C shows internal components of the HCM module 1030. Some of these components include a PC card 1140 that includes at least a processor 1142 and a memory 1144. The PC card 1140 may be a computer board in one embodiment. The processor 1142 is configured to control the charging and data harvesting/transfer of the various nodes 300 and/or 400. In addition, the processor 1142 may be configured to update the firmware of the nodes, and/or test the nodes. The memory 1144 may be configured to store various commands and instructions that are used for executing various operations such as updating the nodes, testing the nodes, charging the batteries of the nodes, and/or controlling the data transfer from the nodes to a server.

For achieving these capabilities, a power transformer 1150 is located inside the HCM module 1030 and this power transformer generates a low-voltage (for example, 12 V) that is used to feed the electronics inside the HCM module 1030, but also the electronics of each docking module 1050. Those skilled in the art will understand that any other voltage may be generated. The low-voltage from the power transformer 1150 is fed to the electronics of each of the docking module 1050. In one application, as illustrated in FIG. 6D, a power cable or wire 1152 extends from the HCM module 1030 to a central power strip 1154, and each of the docking module 1050 may be connected with a corresponding power cable 1051 to the power strip 1154 for receiving its voltage (for example, 220V, but other values are possible). FIG. 6D also shows that the HCM module 1030 is connected with two network wires 1138 (it is possible to use fewer or more wires, e.g., Ethernet cable) to the network connection device 1020, while each docking module 1050 is connected with a corresponding network cable 1059 (e.g., Ethernet cable) to the same network connection device 1020. In this way, a network is established between the HCM module and the docking modules, and data and/or commands between these elements can be exchanged.

Having these network and electrical connections between the various docking modules 1050 and also between the docking modules and the HCM module 1030, it is possible to code the data transmitted from each docking module to the HCM module so that the source of the data (i.e., from which node, and docking module each part of the data is originating) is known at the HCM module 1030. The coding scheme to be discussed next with regard to FIG. 6E can be implemented so that all the docking modules 1050 have the same electrical configuration, i.e., each of the two docking modules 1050 are identical. To avoid to configure the docking device 1000 any time that a docking module 1050 is added or removed (or in case of maintenance), a specific cable 1160 (shown in FIG. 6D) connects the power port 1134 of the HCM module 1030 to each corresponding power port 1055 of the docking modules 1050.

Figure 6E:
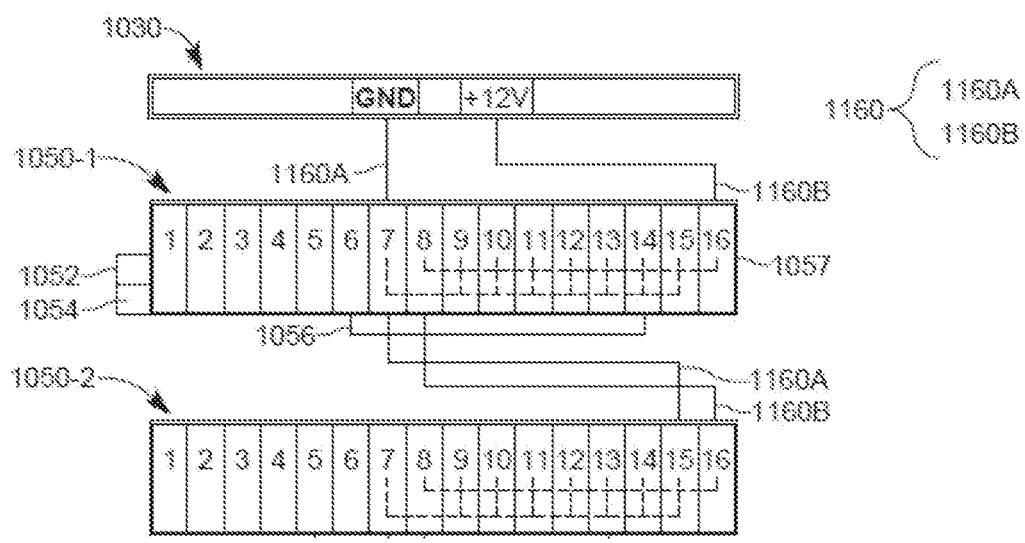
FIG. 6E illustrates part of the electrical configuration of the docking device enabling.

FIG. 6E illustrates part of the electrical configuration of the docking device 1000, and the various electrical connections between the HCM module 1000 and the docking modules 1050, and also some internal electrical connections of the docking modules 1050. Note that each docking module 1050 has an electronic board 1057 having 16 pins. The electronic board 1057 may also include a processor 1052 and a memory 1054. Other elements may be present on the electronic board 1057. The power cable 1160 that extends from the HCM module 1030 to each docking module 1050 has, in this embodiment, a ground wire 1160A that is connected to pin no. 7 of the electronic board 1057 of the first docking module 1050-1, and also has a signal wire 1160B that is connected to pin no. 16. Pin no. 7 is shown in FIG. 6E being internally connected to pin nos. 9-15 while pin no. 16 is internally connected to pin no. 8. Further, the figure shows that pin no. 7 is also connected to pin no. 15 of the second docking module 1050-2 through ground wire 1160A and pin no. 8 is electrically connected through signal wire 1160B to pin no. 16 of the second docking module 1050-2. These power connections can be repeated in the case of further following docking modules.

FIG. 6E also shows a shunt wire 1056 that connects pin no. 6 to pin no. 14 for the first docking module, pin no. 5 to pin no. 13 for the second docking module, and so on. The shunt wire 1056 implements a unique pin connection for each docking module. This unique connection is read by the processor 1052 of each docking module and translated into a LEVEL code, that identifies the level of the respective docking module in the docking device, where the top docking module 1050-1 is LEVEL=1, and the most bottom docking module 1050-6 is LEVEL=6. An name and/or another value may be used for this parameter as long as it indicates the location of the docking module in the docking device.

In addition, each docking module 1050 has its processor connected to six docking bays and the processor 1052 is configured to identify each of the six docking bays, which is coded in a parameter LOCATION, with a value of 1 to 6. Another name for this parameter and other values may be used. When seismic data from the various nodes 300 is downloaded to the docking modules 1050, the processor 1052 in each docking module is configured to generate a value for the parameter LEVEL and a value for the parameter LOCATION, so that each batch of seismic data that is downloaded from a node is stamped with the values of the parameters LEVEL and LOCATION. The seismic data together with these values are then transmitted by each docking module to the HCM module, for example, along network cables 1059 and network connection device 1020.

The illustrated docking device 1000 includes two docking modules 1050. However, the docking device may be configured to have more or less docking modules, depending on the application. The reference number 1050 is used herein to indicate a generic docking module while a reference number 1050-1 is used to refer to a specific docking module. The docking modules are attached to the (frame of the) container 1010 with screws in this embodiment. However, the docking modules may be attached with other means to the frame, for example, clips, or they may slide into dedicated tracks.

Each docking module 1050 has the same configuration and is capable of receiving (1) only DFU nodes, (2) only AFU nodes, or (3) a mixture of DFU and AFU nodes. The same docking module 1050 can be reconfigured to receive one of the nodes configuration (1) to (3). While FIG. 2C illustrates each docking module 1050 having 6 docking bays 1060, it is possible to size the docking module to have less or more docking bays. The reference number 1060 is used herein to generically refer to a docking bay. When referring to a specific docking bay, the reference numbers 1060-1, 1060-2 and so on will be used.

According to embodiments, the docking device may be configured to simultaneously receive and process the two different types of seismic nodes (analog and digital), or to receive and process other types of seismic nodes, in addition to the two types.

In particular, FIG. 7 shows a docking module configured with analog ports 1080 for receiving AFU nodes 400, but the same docking module might be configured with digital ports 1070 for receiving DFU nodes 300 or to receive both the DFU nodes 300 and AFU nodes 400 is not shown wherein different ports are used in the docking bays used to accommodate one or the other node.

The illustrated configuration of the docking module 1050, called herein the analog configuration, uses an analog port 1080 in the docking bays 1060. Some or all of the analog ports might be replaced by a digital port, thereby forming a hybrid configuration or a digital configuration. It is e.g. possible that a first subset of all docking bays to have the digital ports and a second subset of all the docking bays to have the analog ports, where the first and second subset may be equal or less than the entire set of docking bays of a given docking module.

FIG. 7 also shows that each docking bay includes a receptacle 1062 that is configured to receive a cover 320 or 420 of the DFU or AFU nodes. The receptacle 1062 is configured to have, in cross-section, exactly the same shape as the cover 320 or 420. The receptacle 1062 may be made of plastic or rubber or a composite material and may have a depth so that the entire cover of the DFU and AFU nodes fits inside the receptacle. Further, the figures show that each receptacle 1062 has a pair of tabs 1064 (only one is visible in the figures) formed on opposite walls of the receptacle, for engaging with recesses formed in the covers of the nodes so that a good and stable mechanical coupling is achieved between each node and its corresponding docking bay.

Figure 9A:
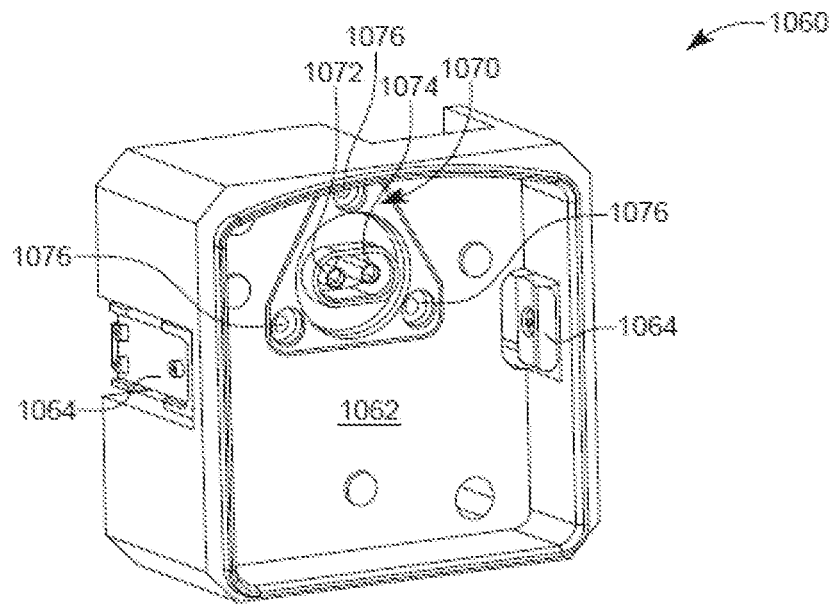
FIGS. 9A and 9B illustrate a docking bay of a docking module of a mobile docking device according to an embodiment of the invention, and a seismic node engaged with the docking bay.
Figure 9B:
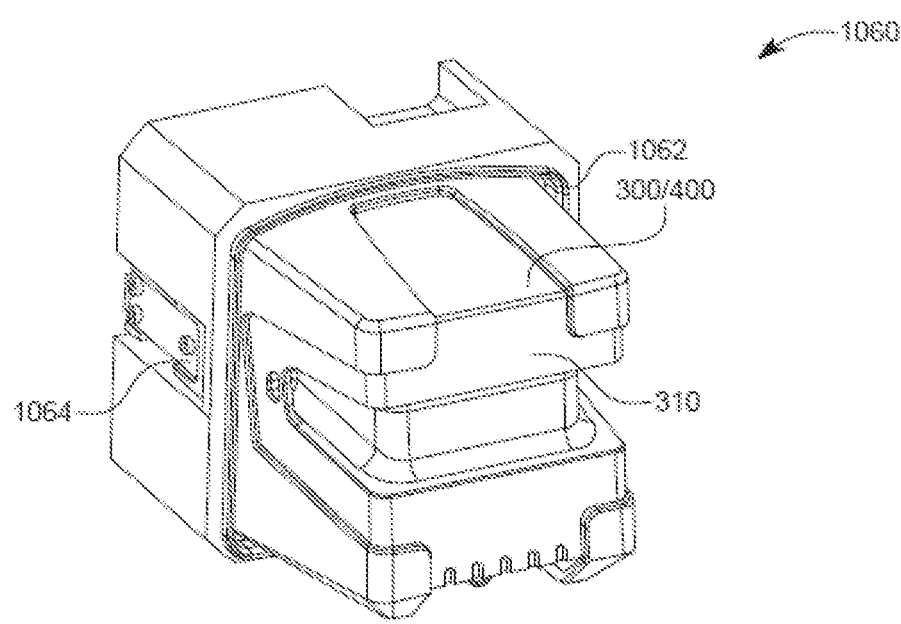
Figure 9C:
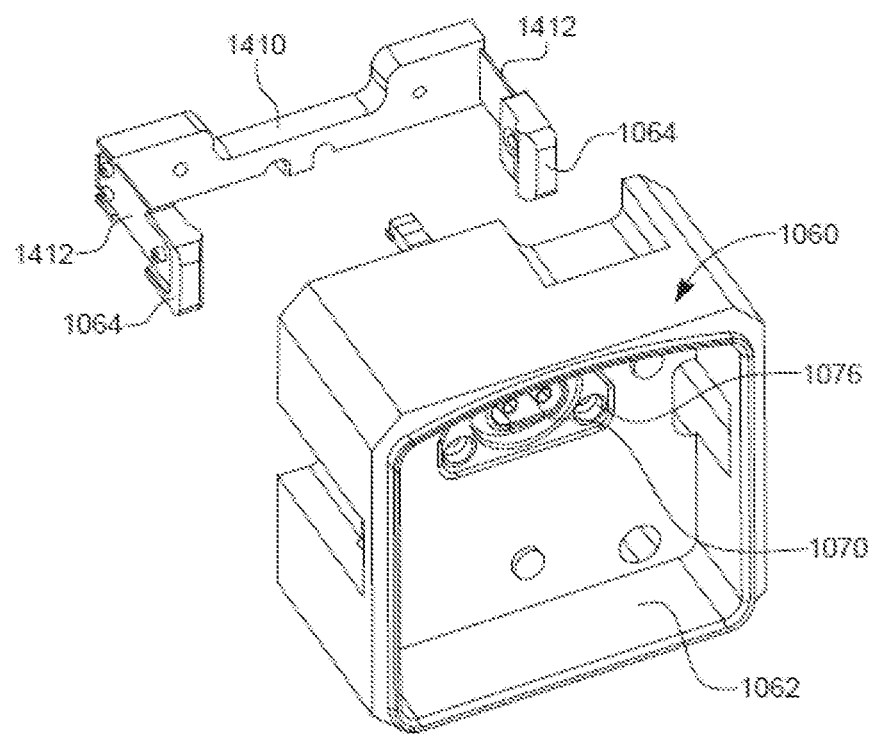
FIG. 9C illustrates a connecting mechanism of the docking bay.

FIG. 9A shows in more detail a docking bay 1060 and its receptacle 1062 with the pair of tabs 1064. FIG. 9A also shows the digital port 1070 having first and second electrical tubular members 1072 and 1074 that are configured to mechanically and electrically engage with the first and second pins 332 and 334 of the cover 320 of the DFU node 300. Further, FIG. 9A shows that the digital port 1070 is attached in this embodiment with three screws 1076 to the receptacle 1062. Those skilled in the art would understand that more or less screws may be used within the scope of the invention, and even other means may be used to fix the digital port to the receptacle. FIG. 9B shows a digital node 300 being attached to the receptacle 1062. Note that in one embodiment, the cover 320 of the node may be fully located within the receptacle so that only the base 310 is visible. FIG. 9C shows the pads 1064 removed from the receptacle 1062. The two pads 1064 may be attached to a beam 1410, through side beams 1412. The side beams 1412 are made of an elastic material so that the pads 1064 can slightly move toward and away from the cover of the node when the node enters or exits the receptacle.

FIG. 10 shows a docking module 1050 having a housing 1510 that is configured to receive six docking bays 1060. FIG. 10 also shows the digital ports 1070 and the analog ports 1080 removed from their corresponding receptacles 1062. As previously discussed, the digital ports and the analog ports are interchangeably attached to the receptacle. The digital and analog ports are configured to slide into corresponding recesses 1061 formed in the receptacle 1062 of each docking bay 1060. FIG. 10 shows that an exterior shape of the digital ports and the analog ports are identical so that they fit in the same recess 1061 in the docking bay 1060. In this embodiment, the exterior shape of the digital and analog ports are triangular in cross-section. However, the cross-sections shapes of these ports may also be rectangular, square, diamond, or any other shape. In one embodiment, the color of the digital ports is different from the color of the analog ports so that the operator of the docking device can, with a single glance, identify what type of ports are in use. Also, when the ports needs to be swapped, by having different colors for the analog and digital ports, prevents the operator of the station to install the wrong port.

Figure 11:
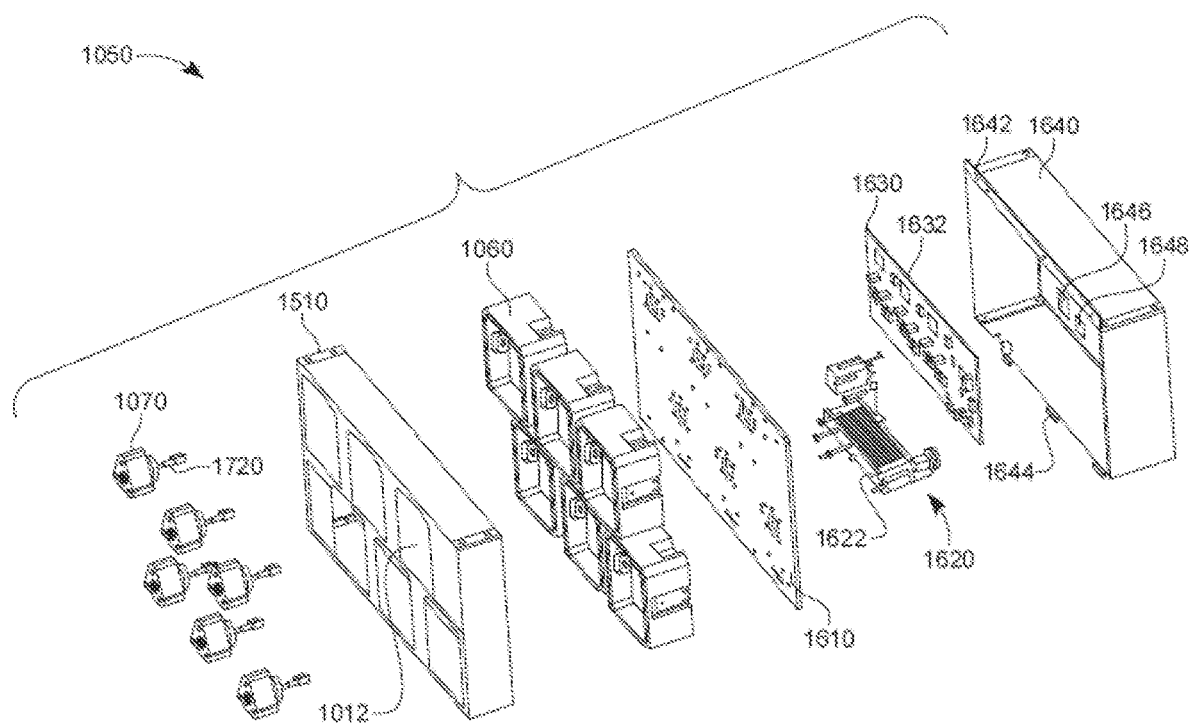
FIG. 11 is an exploded view of a docking module of a mobile docking device according to an embodiment of the invention.

An exploded view of the docking module 1050 is shown in FIG. 11 and includes the digital ports 1070 (and/or analog ports 1080), housing 1510, and docking bays 1060. While the docking bays 1060 are configured to fit into corresponding slots 1012 into the housing 1510, they are mechanically attached, for example, with screws, to a board 1610. The docking module 1050 also includes electrical components 1620. Among the electrical components 1620, there is a power transformer 1622, that is configured to step down an incoming voltage (220 or 110V) to a given low voltage (e.g., 5V) that is distributed to each docking bay for recharging the various nodes. In this regard, note that each docking module 1050 may have an electrical power port, attached to the back of the support housing 1640, which is configured to be connected to an electrical outlet, present inside the docking device 1000. For example, the power out port 1122 of the HCM module 1030 may be connected to a power strip located inside the container 1010 of the docking device 1000 and the power strip may include plural power outlets, one for each docking module. The low-voltage end of the power transformer 1622 is connected to each of the digital or analog ports of the docking bays for that module, through an electrical contact, that is discussed later. The docking module 1050 may also include a printed circuit board 1630 that includes at least a processor 1632, whose functions include, but are not limited to, monitoring each node, its status, the battery level of the node, coordinating the seismic data transfer from the node to a server, applying an update to the software of the node, and testing the node. The processor 1632 is a local processor. The processor 1632 (in one embodiment, there are more processors in each docking module) may cooperate with the global processor 1142 of the HCM module 1030 in implementing all these functions.

All these electronic elements are placed in the housing support 1640, which may be a metallic box having a lip 1642 with one or more holes that allow the entire docking module to be attached with screws to the container 1010 of the docking device 1000. In one embodiment, the housing support 1640 is configured to mate with the housing 1510 so that one side of each of these elements uses a clamp like system 1644 to engage with each other, while an opposite side of these two elements can be joined with screws or equivalent devices. A power port 1646 may be fixed to the back of the housing support 1640 for receiving, through the cable 1051 discussed above with regard to FIG. 6D, the voltage (e.g., 12V as discussed above with regard to the HCM module) from the power strip 1154 located inside the docking device. A communication port 1648 (for example, Ethernet port or any other port that allows data communication) may also be attached to the back of the housing support 1640 and this port is connected, through cable 1053 discussed in FIG. 6D, to the network connection device 1020, for getting access to the internet or an internal network that is used for transferring the seismic data from the node to a server. In one embodiment, the server may be located anywhere, remotely or closely to the docking device. In one application, the server may be located inside the docking device. Regardless of where the server is located, it is connected to the network connection device 1020, either directly, or over a private network, or over the internet for receiving the seismic data from each node.

Figure 12A:
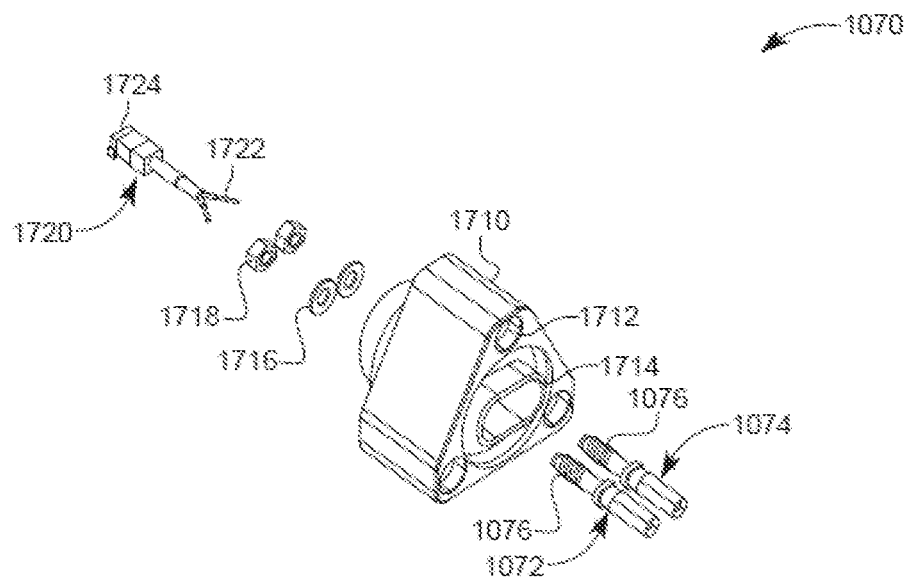
FIG. 12A is an exploded view of a digital port and FIG. 12B is an exploded view of an analog port that can be used with a docking module of a mobile docking device according to an embodiment of the invention.
Figure 12B:
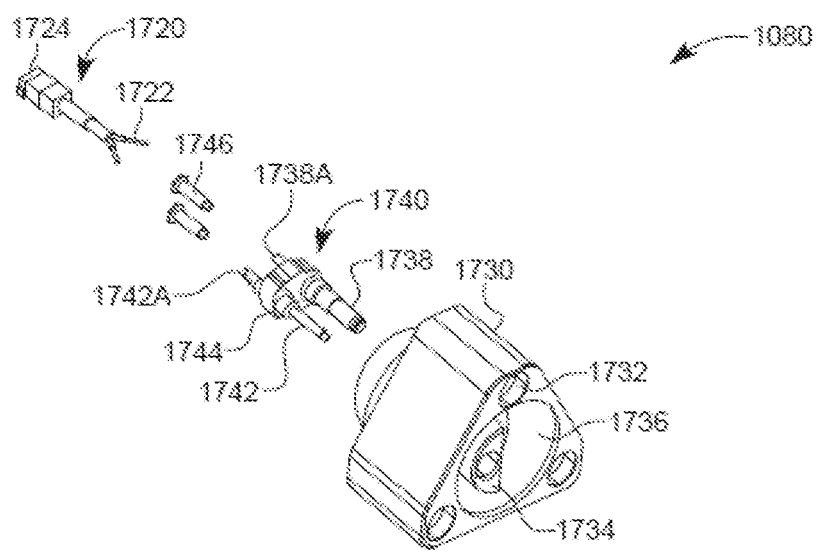

Regarding the digital and analog ports 1070 and 1080, they are shown in an exploded view in FIGS. 12A and 12B. FIG. 12A shows the digital port 1070 having a body 1710 that has a triangular cross-section. As previously discussed, the body 1710 may have other shapes, as long as the recess 1061 formed in the receptacle 1062 of the docking bay 1060 has the same cross-section shape. The body 1710 has in this embodiment three holes 1712 that are configured to receive corresponding screws 1076, as shown in FIG. 9A. As also previously discussed, the body 1710 may have only two or more than three holes, depending on the shape of the body. The body 1710 has an internal lip 1714 formed in a central part, that is configured to protect the first and second tubular pins 1072 and 1074. In one embodiment, the first and second tubular pins are identical.

The first and second tubular pins 1072 and 1074 may be configured to have a thread 1076 at one end, which is configured to engage a corresponding washer 1716 and nut 1718, to fix the tubular pins to the body 1710. An electrical connection 1720 may have two wires 1722 that are configured to enter the ends of the tubular pins 1072 and 1074, and be crimped there, to achieve electrical connection. The electrical connection 1720 is configured to have a head 1724 that connects, for example, to the printed circuit board 1630 (see FIG. 11) of the docking module 1050. In fact, FIG. 11 shows the digital ports 1070 and their back electrical connection 1720. The back electrical connection 1720 is configured to attach to the printed circuit board 1630 in a wireless manner. The term "wireless" is used in this paragraph to mean that no manual connection is necessary between the head 1724 and the printed circuit board 1630, as the head 1724 is configured to simply slide into a receiving contact on the printed circuit board 1630 for achieving the electrical connection. In this regard, the connection between the back pins of the cover 320 or 430 and electronic components of the nodes is also achieved in a wireless manner, i.e., there is no need of manual connection between these elements to achieve electrical connection. With this wireless electrical connection, after the screws of the digital port 1070 are removed, the digital port 1070 can simply be removed from the corresponding receptacle and the analog port 1080 can be inserted in its place.

The analog port 1080 is shown in FIG. 12B as having a different type of body 1730 than the digital port 1070. A cross-section of the body 1730 is identical to the cross-section of the body 1710 as both these bodies have to fit in the same recess 1061 in the receptacle 1062. However, the body 1730 has, instead of the lip 1714, a half-part 1734 that occupies about a half of the recess 1736 formed in the body 1730. The other half of the recess 1736 is empty. This configuration of the analog port 1080 corresponds to the connecting mechanism illustrated in FIG. 5 which would fit inside a tubular pin 1738 of the electrical part 1740, that fits into the body 1730. The electrical part 1740 has, in addition to the tubular pin 1738, a pin 1742 that fits into the tubular member of the connecting mechanism. Note that the configuration of the connecting mechanism is also used for the external connection plug 430 of the cover 420 in FIG. 4A. Returning to FIG. 12B, the tubular pin 1738 and the pin 1742 are attached to a holding part 1744, which is made, for example, from plastic, and is configured to hold these elements separated from each other. The tubular pin 1738 and the pin 1742 extend through the entire holding part 1744 and have corresponding back pins 1738A and 1742A, respectively. The back pins 1738A and 1742A may be connected to transition elements 1746, and also to the wires 1722 of the electrical connection 1720. The back pins 1738A and 1742A, transition elements 1746, and the wires 1722 may be crimped together to achieve good mechanical and electrical connection. Because the digital port 1070 and the analog port 1080 share the same electrical connection 1720, they can be easily interchanged and placed in the receptacle 1062.

Further, the docking bays 1060 are so distributed in the docking module 1050 so that the DFU node 300 may be placed into a corresponding docking bay 1060 together with its spike 306, i.e., the spike 306 does not have to be removed prior to attaching the node to the docking bay. The spike 306 can extend between two docking bays located below the current docking bay. This means that the base 310 is configured to have the receiving unit 350, to which the spike 306 is attached to, offset from the cover 320 or 420 with a distance enough to allow the receiving unit 350 to remain outside the receptacle 1062 of the docking bay 1060. This feature makes the process of placing the node into the docking module quick, thus saving time.

Figure 14:
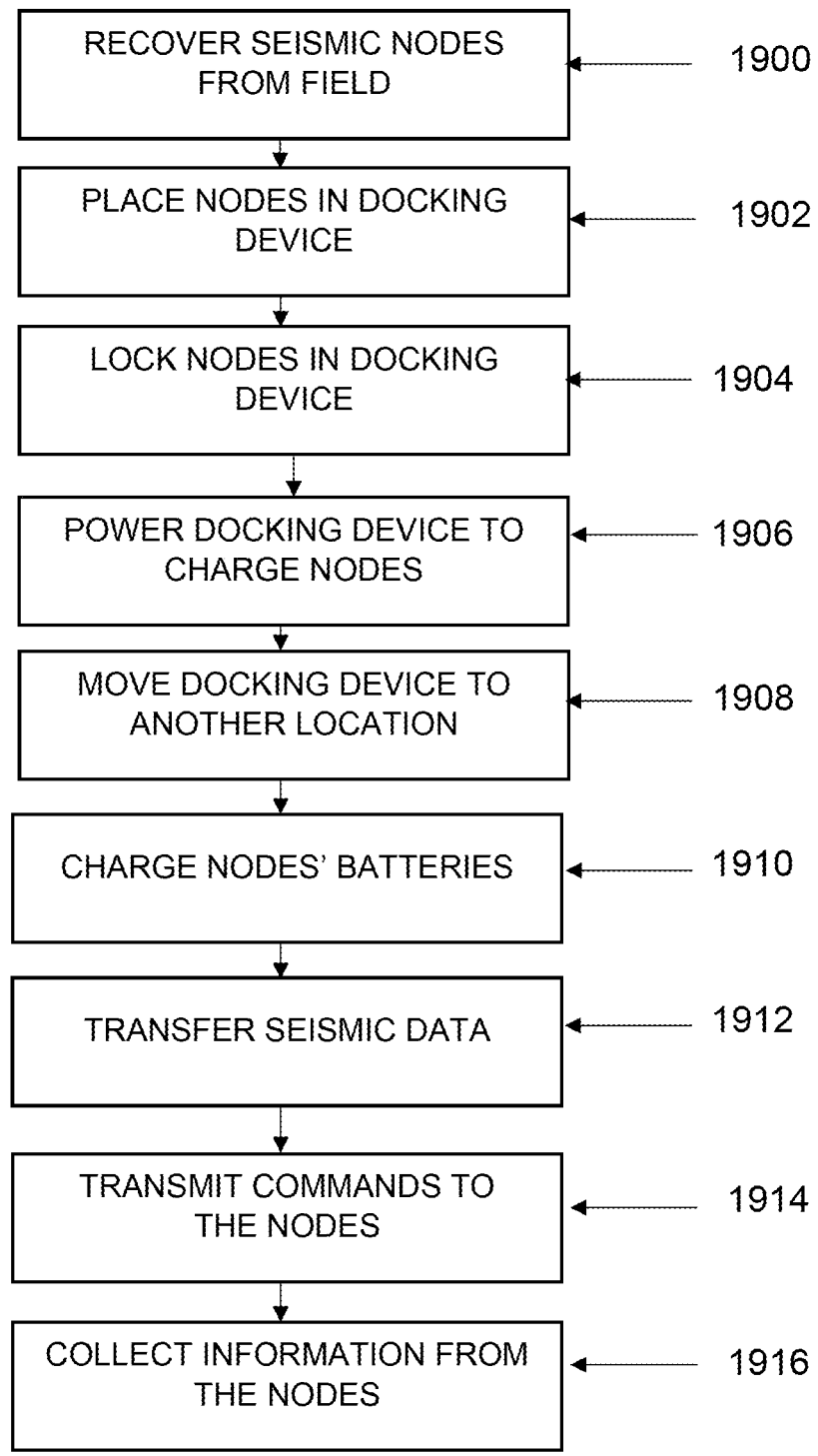
FIG. 14 is a flowchart of a method for recharging and/or harvesting seismic nodes with a mobile docking device according to an embodiment of the invention.

A method for recharging a seismic node and/or transferring seismic data from the node to a server is now discussed with regard to FIG. 14. In step 1900, a set of (preferably wireless), autonomous, seismic nodes are recovered from the field after a seismic survey has been performed. The set of seismic nodes may be divided into a first subset of digital seismic nodes 300, and a second subset of analog seismic nodes 400. In one application, the first subset is null and the second subset is equal to the set. In another application, the second subset is null and the first subset is equal to the set. In still another application, both the first and second subsets are non-zero.

In step 1902, the set of seismic nodes is placed into corresponding docking bays 1060 of docking modules of a mobile docking device as described above. The digital seismic nodes and the analog seismic nodes share a same base. The digital seismic nodes have a spike attached to the base while the analog seismic nodes do not have such a spike. The spike lies outside a docking bay of the docking module while the digital seismic node is placed into its bay.

In step 1904, the seismic nodes are locked in place into the docking bays 1060 with an attachment system to prevent disconnection of these nodes, and/or with the front wall. According to an embodiment, the attachment system comprises a strap system 1053 as proposed above. The strap system can comprise a strap device for each row of docking bays. Each strap device includes at least one strap that is adjusted to be under tension and apply against the nodes of a row, preferably by passing through a groove 340 of each node. Alternatively or further, in this step, the front wall 1300 is closing the opening so that the nodes are biased in their docking bays to prevent the nodes from electrically disconnecting from the docking bays, and also to prevent the nodes from falling off the mobile docking device.

In step 1906, the operator powers on the docking device 1000 to proceed to charging and/or data harvesting of the seismic nodes 300, 400 and the moving docking device is moved in step 1908 from one location to another one while charging and/or data harvesting the seismic nodes.

In step 1910, the processor of the HCM module determines the power level of the battery of each node and starts charging the battery. In step 1912, the seismic data stored in the seismic nodes is transferred from each node, through the HCM module, to a server.

According to particular embodiments, in step 1914, the processor of the HCM module runs one or more software instructions for the seismic nodes. The software instructions may include test related instructions, or update instructions, or other instructions that are applied to the seismic nodes and are known in the art. In step 1916, the processor of the HCM module collects various information from the docked seismic nodes and display them and the associated information on a monitor attached to the docking device.

One the seismic acquisition units are physically secured into the docking bays thanks to the attachment system, the docking device can be loaded and transported with a vehicle or moved on its own wheels or carried by one or two persons from the survey area to another location, that can be another survey area, without interruption of the operations, such as charging and harvesting, applied by the docking device to the seismic nodes.

One type of nodes can be removed from the docking device and their docking bays may be reconfigured to receive another type of nodes. This step includes removing a first type of connecting ports from the docking bays and placing a second type of connecting ports into the docking bays. No other preparation steps are necessary for transforming a docking module from receiving one type of nodes to another type.

According to embodiments, it is also possible to form an assembly comprising a plurality of docking devices 1000. To this end the docking devices 1000 are connectable one to another in a network configuration, for instance using the ethernet connections 1200 that are accessible via the trapdoor 1333 of the rear wall 1330 of the container. At least one of the docking devices 1000 is provided with a radio communication device including an antenna for communicating to an external terminal data harvested by at least one of the docking devices. Communication can be executed according to a WIFI protocol. The docking devices 1000 may also be mechanically connected one to another, for instance to be stacked.

The above-described docking device is configured to enable the operator to connect a plurality of seismic nodes into the docking device for charging the batteries and/or for harvesting the data of the seismic nodes and to physically maintain the nodes in the docking bays so that the operations executed by the docking device with the seismic nodes can continue even during a transport of the docking device.

Indeed, when the seismic nodes are connected into the docking device and that the docking device is running, for instance for charging the seismic nodes and/or harvesting the data, the attachment system enables the seismic nodes to remain reliably connected into the docking device, thus allowing the docking system to be moved from one location to another location, in particular in a vehicle and despites on-road vibrations or shocks to which the docking device may be exposed. On the contrary, already known docking systems are intended to be used in a static mode. The attachment system of the proposed docking device reduces the risk of disconnections of the seismic nodes during a mobile phase, for instance when the docking device is transported on-road. The docking device can also be easily moved on a survey area using a light vehicle, such as a pick-up or a light truck, and, when provided with wheels, the docking device can be easily moved on the field during a corresponding seismic survey. The proposed docking device can thus be used as a mobile harvester and charging rack for seismic nodes, that can be used even during a transport phase.

The disclosed embodiments thus provide a mobile docking device that is configured to receive seismic nodes and to maintain them in position inside the container of the docking device for battery charging and data transfer, even during a transport of the docking device. In particular, the current docking device can be used with the nodes as described in patent application U.S. Ser. No. 16/569,755, having the Title "Wireless seismic acquisition node and method" filed by the applicant. The docking device includes plural docking bays that can be reconfigured, by replacing a connection port, to receive either digital nodes or analog nodes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

The disclosed embodiments provide a docking device that is also particularly suitable for use in combination with the device described in patent application U.S. Ser. No. 16/569,846 having the title "Multi-function acquisition device and operating method" filed by the applicant.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] U.S. Pat. No. 7,668,044.
[2] International Patent Application WO 2021/048630.
[3] International Patent Application WO 2013/015795.

What is claimed is:

1. A mobile docking device configured to receive seismic acquisition units, the mobile docking device comprising:
   a container having a front opening;
   a docking module located within the container, the docking module having plural docking bays, each docking bay being configured to receive one of the seismic acquisition units through the front opening;
   a removable front wall configured to be attached to the container to cover the front opening to secure the seismic acquisition units; and
   handles attached to the container,
   wherein the removable front wall biases the seismic acquisition units to maintain a direct electrical connection between tubular pins of the plural docking bays and pins of the seismic acquisition units during transport of the mobile docking device.

2. The mobile docking device of claim 1, wherein the container includes:
   lateral walls having the handles so that the mobile docking device can be carried by an operator from one location to another.

3. The mobile docking device of claim 1, further comprising:
   an attachment system configured to securely attach each of the seismic acquisition units to a corresponding docking bay.

4. The mobile docking device of claim 3, wherein the attachment system includes:
   a belt; and
   an adjustment system for tensioning the belt.

5. The mobile docking device of claim 4, wherein the attachment system further includes:
   a gap block attached to the belt and configured to make direct contact with a middle seismic acquisition unit in a row of docking bays of the plural docking bays.

6. The mobile docking device of claim 4, wherein the belt is positioned to fit a groove of corresponding seismic acquisition units disposed in a row of docking bays of the plural docking bays.

7. The mobile docking device of claim 1, wherein the front wall has a volume that is configured to accommodate part of the seismic acquisition units.

8. The mobile docking device of claim 1, further comprising:
   a removable rear wall configured to be attached to the container,
   wherein the removable rear wall has a trapdoor for allowing quick access to a charging and data harvesting system.

9. The mobile docking device of claim 8, wherein the charging and data harvesting system is configured to charge batteries of the seismic acquisition units and for harvesting the seismic data stored in the seismic acquisition units.

10. The mobile docking device of claim 1, further comprising:
    wheels attached to a bottom of the container to allow a movement of the container from one location to another one while the seismic acquisition units are secured in place by the removable front wall; and
    at least one storage cavity to store the wheels.

11. The mobile docking device of claim 1, wherein the plural docking bays are arranged in rows, each row is positioned offset relative to a next row so that a seismic acquisition unit fits into a corresponding docking bay together with a spike that extends away from the seismic acquisition unit.

12. A seismic data exchange system configured to exchange seismic data, the seismic data exchange system comprising:
    analog seismic acquisition units;
    digital seismic acquisition units that share a same base with the analog seismic acquisition units, but have a different cover; and
    a mobile docking device configured to receive the analog and digital seismic acquisition units,
    wherein the mobile docking device has handles to allow a movement of the analog and digital seismic acquisition units from one location to another while being charged, and
    wherein the mobile docking device has a removable front wall configured to allow, in an open state, the analog and digital seismic acquisition units to be attached to corresponding docking bays located within the mobile docking device, and to be secured, in a closed state, to the corresponding docking bays when moving from the one location to another.

13. The seismic data exchange system of claim 12, wherein the mobile docking device comprises:
a container having a front opening;
a docking module located within the container, the docking module housing the docking bays, each docking bay being configured to receive the analog or digital seismic acquisition units through the front opening; and
the removable front wall configured to be attached to the container to cover the front opening to secure the analog and digital seismic acquisition units.

14. The seismic data exchange system of claim 13, wherein the front wall biases the analog and digital seismic acquisition units to maintain a direct electrical connection between tubular pins of the corresponding docking bays and pins of the analog and digital seismic acquisition units during transport of the mobile docking device.

15. The seismic data exchange system of claim 13, wherein the mobile docking device further comprises:
lateral walls having the handles so that the mobile docking device can be pushed on the wheels by an operator.

16. The seismic data exchange system of claim 13, further comprising:
an attachment system configured to securely attach each analog and digital seismic acquisition unit to a corresponding docking bay,
wherein the attachment system includes:
a belt; and
an adjustment system for tensioning the belt.

17. The seismic data exchange system of claim 13, wherein the front wall of the mobile docking device has a volume that is configured to accommodate part of the seismic acquisition units.

18. The seismic data exchange system of claim 13, wherein the mobile docking device further comprises:
a removable rear wall configured to be attached to the container; and
wheels attached to a bottom of the container,
wherein the removable rear wall has a trapdoor for allowing quick access to a charging and data harvesting system.

19. The seismic data exchange system of claim 12, wherein the docking bays are arranged in rows, each row is positioned offset relative to a next row so that an analog or digital seismic acquisition unit fits into a corresponding docking bay together with a spike that extends away from the seismic acquisition unit.

20. A method for charging and data harvesting seismic acquisition units within a mobile docking device during a transport of the mobile docking device from one location to another, the method comprising:
collecting seismic acquisition units from a field;
placing the seismic acquisition units in the mobile docking device, which includes a container that houses a charging and data harvesting system and plural docking bays;
locking the seismic acquisition units to corresponding docking bays with an attachment system and with a front wall to prevent disconnection of these seismic acquisition units;
powering on the mobile docking device to proceed to charging or data harvesting of the seismic acquisition units; and
moving the mobile docking device to another location while charging and data harvesting.

\* \* \* \* \*